US006477566B1

(12) United States Patent
Davis et al.

(10) Patent No.: US 6,477,566 B1
(45) Date of Patent: *Nov. 5, 2002

(54) METHOD AND SYSTEM OF PROVIDING IMPROVED NETWORK MANAGEMENT DATA BETWEEN A PLURALITY OF NETWORK ELEMENTS AND A MANAGEMENT SYSTEM FOR INCREASING A FLOW AND DECREASING AN AMOUNT OF DATA TRANSFER

(75) Inventors: Nigel Robert Davis, Middlesex; Yossi Kanzen, London, both of (GB)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,387

(22) Filed: Jan. 21, 1998

(30) Foreign Application Priority Data

Dec. 10, 1997 (GB) .............................................. 9726098

(51) Int. Cl.[7] ............................................. G06F 15/173
(52) U.S. Cl. ...................... 709/223; 709/201; 709/202; 709/224; 707/10
(58) Field of Search ........................ 709/213, 220–222, 709/223–230, 250, 200–205; 707/1, 9, 10; 714/1–5

(56) References Cited

U.S. PATENT DOCUMENTS 5,434,976 A * 7/1995 Tan et al. .................... 709/234
5,548,724 A * 8/1996 Akizawa et al. ............ 709/203

(List continued on next page.)

FOREIGN PATENT DOCUMENTS

EP 0 585 082 A 3/1994 ........... H04L/12/24
GB 2 308 779 A 7/1997

OTHER PUBLICATIONS

Seshake H et al: "Data Communication Platform In Distributed Operations System Based On TMN" IEE Network Operations and Management Symposium (NOMS), US, New York, IEEE, vol. SYMP 5, 1996, pp. 349–359.

Makoto Yoshida: "An Overview Of Next–Generation Operations Systems. Toward Operations and Management with Customer Participation". NTT Review, JP, Telecommunications Association, Tokyo, vol. 6 No. 3, May 1, 1994 pp. 59–65.

Luca Deri et al: "An Object Oriented Approach to the Implementation of OSI Management" Computer Networks and ISDN Systems, NL, North Holland Publishing. Amsterdam. vol 27, No. 9, Aug. 1, 1995, pp. 1367–1385.

(List continued on next page.)

Primary Examiner—Bharat Barot
(74) Attorney, Agent, or Firm—Lee, Mann, Smith, McWilliams, Sweeney & Ohlson

(57) ABSTRACT

In a management system of a communications network comprising a plurality of network elements, capacity and capability of one or more individual network elements is represented by a set of data templates. A first set of data templates represent internal construction and physical resources of a network element. A second set of templates represent connectivity capabilities of the physical resources. The data templates are stored at an element controller, controlling a plurality of network elements. The element controller learns about the capacity and capabilities of the network elements, by receiving a set of reference messages generated by the network elements, over an operations, administration and maintenance channel. The reference messages point to the data templates stored at the element controller thereby enabling efficient enrollment of network elements by transmission of compressed messages over the operations, administration and maintenance channel.

23 Claims, 21 Drawing Sheets

U.S. PATENT DOCUMENTS

| | | | | |
|---|---|---|---|---|
| 5,678,041 A | * | 10/1997 | Baker et al. | 709/229 |
| 5,708,778 A | * | 1/1998 | Monot | 709/228 |
| 5,764,915 A | * | 6/1998 | Heimsoth et al. | 709/227 |
| 5,793,958 A | * | 8/1998 | Clement et al. | 709/220 |
| 5,966,509 A | * | 10/1999 | Abe et al. | 709/223 |
| 5,987,513 A | * | 11/1999 | Prithviraj et al. | 709/223 |
| 5,991,814 A | * | 11/1999 | Rzonca et al. | 709/223 |
| 6,049,819 A | * | 4/2000 | Buckle et al. | 709/223 |
| 6,167,445 A | * | 12/2000 | Gai et al. | 709/223 |
| 6,223,219 B1 | * | 4/2001 | Uniacke et al. | 709/223 |

OTHER PUBLICATIONS

ITU–T Recommendation M3010, 5/96, pp. 16–21, 47, 48.

ITU–T Recommendation G.774, 9/92, pp. 1–103.

* cited by examiner

*Get List of Network Elements*

*Get List of Endpoints*

*Get Endpoints Templates*

*Get CTP Group Templates*

METHOD AND SYSTEM OF PROVIDING IMPROVED NETWORK MANAGEMENT DATA BETWEEN A PLURALITY OF NETWORK ELEMENTS AND A MANAGEMENT SYSTEM FOR INCREASING A FLOW AND DECREASING AN AMOUNT OF DATA TRANSFER

FIELD OF THE INVENTION

The present invention relates to network management and particularly, although not exclusively to management of a communications network.

BACKGROUND OF THE INVENTION

A conventional communications network, for example a broadband communications network comprises a plurality of physical resources, eg switches, cross connects, regenerators, repeaters, transmission links such as fiber optic links or coaxial cable links, operating under control of a plurality logical resources, eg transport protocols, and local controls associated with individual physical resources. An example of a generic representation of a communications network is illustrated in FIG. 1 herein, in which the physical resources are located at a plurality of nodes 100 and links 101 distributed over a geographical area. For a network operator to maintain control of a communications network for its operation, administration and maintenance, a management information base is maintained which stores information describing the physical and logical resources within the network. One or more management information bases may reside at a centralized location, eg a network controller 102, or different information bases may be situated at a plurality of network controllers at different locations. The management information base contains data describing each individual network element in a communications network. A conventional communications network may comprise of the order of hundreds of individual network elements, eg switches, cross connects, regenerators, each of which contains of the order of tens to hundreds of cards, having processors, line terminations, buffers, registers, switch fabrics, etc. each card containing of the order of hundreds of individual components. In general, a conventional communications network may comprise a multitude of different legacy equipment types of different proprietary manufacture, each of which has its own particular internal configuration and offers its own specific capabilities.

The International Telegraph and Telephone Consultative Committee (CCITT) of the International Telecommunications Union (ITU) in their recommendation G.774 published September 1992 (available from International Telecommunication Union, General Secretariat, Sales Service, Place de Nation, CH 1211, Geneva 20, Switzerland), specifies a recommended architecture of an information model for synchronous digital hierarchy (SDH) networks. In recommendation G.774, there is specified a model which describes managed object classes and their properties which are useful for describing information exchanged across interfaces defined in recommendation M.3010, telecommunications network management (TMN) architecture, also of the ITU-T. Recommendation G.774 identifies the telecommunications management network (TMN) object classes required for the management of SDH network elements, and specializes the generic object classes presented in recommendation M.3010 to provide management information specifically for synchronous digital hierarchy. These objects are relevant to information exchanged across standardized interfaces defined in recommendation M.3010 TMN architecture. In recommendation G.774, network resources are modeled as objects and a management view of a resource is referred to as a managed object. Objects with similar attributes may be grouped into object classes. An object is characterized by its object class and object instance, and may possess multiple attribute types and associated values. Object classes defined in recommendation G.774 apply to various management areas, for example fault management and configuration management. However, the inventors have experienced that the ways in which information is conveyed in accordance with methods specified in recommendation G.774 have several inadequacies.

Firstly, under conditions of equipment start-up, large amounts of data are transferred across the network, using up capacity on the operation administration and maintenance (OAM) channels. For example, for a network element having a shelf containing 25 line cards, on start-up each line card transmits enrol data describing each of the termination points on that line card, as well as data describing the relationships between the termination points on that line card. Every time the shelf is started up, the same termination point enrol data and relationship data is transmitted across the OAM channel to the management information base. For successive start-ups of the shelf, the enrol procedure is repeated, transmitting the same information on every start-up. Similarly, on starting up an identical shelf, the same enrol data is transmitted to the management information base, every time that other shelf is started up. Thus, under conditions of network fault, when a plurality of network elements are restarted, the whole enrol procedure for each network element is repeated. However, the information transmitted is basically static, ie the same as the information which was transmitted last time the shelf was started up.

Some prior art systems have addressed the problem of large data volumes on the OAM channel by operating on a principle of Assumed Management Knowledge. In these cases, a network manager assumes that certain network elements have certain capabilities and that they operate in a particular way. This avoids having to explicitly elicit the actual information concerning the operation of the elements from the elements themselves, or from another source in the network, since obtaining such information would cause a high level of management traffic. One consequence of the assumed knowledge system is that assumptions may be erroneous and the network elements may operate in a way different to that assumed, leading to network management errors or less than optimal management of specific network elements, and of the network as a whole.

Secondly, the recommended management information model G.774, although providing for description of the content and configuration of a physical resource, does not adequately accommodate description of the capabilities of that physical resource. In particular, recommendation G.774 assumes potentially infinite flexibility of configuration of a described physical resource, whereas in practice there are practical limitations on the possible configurations of a resource. For example, physical resources may be subject to hard wired restrictions as a result of restrictions in an application specific integrated circuit (ASIC). Thus, irrespective of the way in which the physical resource is modeled in an information base, physical limitations on connectivity of the physical resource may exist. As an example, consider a physical resource having four ports numbered 1 to 4. Ports 1 and 2 may be capable of connecting with each other and to a further port, port 4. However, ports 1 and 2 may be incapable of connecting to port 3 due to a hard wired restriction on connectivity in the resource. However, recommendation G.774 does not provide a way of expressing such connectivity restriction, but assumes any port of the physical resource can be connected to any other port of the physical resource. Recommendation G.774 does not provide for description of such inherent capability restrictions in a physical resource.

SUMMARY OF THE INVENTION

One object of the present invention is to provide an improved means for initialization of a management information base upon start up of physical resources in a network.

Specific methods according to the present invention may provide a means of increasing a flow of management information between a plurality of network elements and a management system, but using a lower amount of data transfer between the network elements and the management information base.

Another object of the present invention is to provide a means of conveying information concerning capabilities of physical resources to a management information system.

Specific methods according to the present invention may provide a means of describing capabilities of a physical resource which encompasses an unlimited range of possible capabilities, but which is also capable of describing specific limitations on capability within specific network element types.

According to one aspect of the present invention there is provided in a communications network comprising a plurality of network elements, a method of providing management data describing available capabilities of a said network element, said method comprising the steps of:

representing resources of said network element by at least one data template representation; and referring to said data template representation by means of a message generated by said network element.

In a preferred implementation, said messages are communicated over an operations, administration and management channel of said communications network. The messages may provide an efficient means of compression of information transmitted over an OAM channel.

Preferably, said step of referring to said data template representation comprises the steps of:

representing each of a plurality of end points of said network element by a corresponding respective end point data, each said end point data comprising a reference to at least one said data template representation.

A said data template representation may comprise data describing a plurality of protocol layers operated by a said physical resource.

The physical resources suitably comprise a plurality of end points at which data packets, cells or frames may emerge or sink. The end points may comprise a physical or logical port. The physical resources suitably comprise a set of pre-configured structures, eg of layered termination points connected into end points.

Preferably, said step of representing resources by at least one data template representation comprises the step of representing connectivity capability between a plurality of ports of a said network element by a said data template representation.

Said step of representing resources of said network element by at least one data template representation may comprise the step of representing connections capability between a plurality of ports of said network element at a same layer as each other by a set of connection rules describing inter-port connections.

A set of said connection rules at a same layer may be collected into a connection group.

Said step of representing resources of said network element by at least one data template representation may comprise the step of representing connection capabilities between individual ports of a plurality of ports of said network element by a set of connection rules between said groups.

Suitably, each said port is represented by a corresponding respective end point data.

A said message may comprise a plurality of said end point data, each end point data representing a corresponding respective end point.

The invention includes a management system for managing a network element comprising a plurality of physical resources arranged into a plurality of pre-configured structures each of a pre-configured structure type, said management system comprising a data storage storing:

at least one data template, said data template representing a said pre-configured structure; and a plurality of reference data, each said reference data referring to a said pre-configured structure and to at least one said data template.

According to a second aspect of the present invention there is provided a data representation of a physical resource operating in accordance with a protocol having a plurality of layers, said resource comprising at least one termination point in a said layer, at least one adaptation capability for adapting between said layer of said termination point and a client layer, and a connection capability for connecting said termination point, said data representation comprising:

termination point data describing a said termination point within a said layer;

adaptation rule data describing adaptation rules between said layer and a further layer; and connection rule data describing connection capabilities of said termination point.

Preferably, said connection rules describe connection capabilities of said termination point within a same layer as said termination point.

Said connection rules may describe connection capabilities of said termination point to a layer other than a layer of said termination point.

Preferably, said termination point data comprises data describing a type of termination point.

Preferably, said adaptation rule data comprises data describing a relationship to a next rule in a logic list.

Characteristics of said termination point other than its layer may be stored in a sub-type of said termination point data component.

Said sub-type is preferably implemented as an ASCII field. Said template may be implemented in UNIX external data representation (XDR) language. Said template may be implemented in common object related broker architecture interface definition language (CORBA IDL). Said template may be implemented in ASN1 GDMO, simple network management protocol (SNMP), JAVA, or C+ structure definitions.

Preferably, said adaptation data component comprises data describing a transport protocol. For example, said transport protocol may comprise synchronous digital hierarchy, or asynchronous transfer mode (ATM); or a 64 kilobits per second transport protocol. Said transport protocol may comprise synchronous optical network (SONET).

According to a third aspect of the present invention, there is provided in a communications network comprising a plurality of network elements, said network elements comprising a plurality of physical resources organized into a plurality of types of pre-configured structures, a method of providing management data describing available capabilities of said network elements, said method comprising the steps of:

representing a plurality of said physical resources by a set of data templates representations, and representing said plurality of physical resources by a plurality of reference data, each said reference data referring to a said pre-configured structure and each said reference data referring to at least one said data template representation.

Suitably, each said data template represents a corresponding respective said pre-configured structure type.

A said pre-configured structure may comprise a layered structure, and a said data template may represent said layered structure.

A said pre-configured structure may comprise a layered structure having first and second layers, and a said data template may comprise: a termination point data describing at least one termination point at said first layer of said pre-configured structure; and a set of adaptation rule data describing adaptation rules for adapting between said first layer and said second layer of said pre-configured structure.

A said pre-configured structure may comprise a physical port, and a said data template may represent a physical structure of said physical port.

A said pre-configured structure may comprise a logical port, and a said data template may represent a logical structure of said logical port.

A said reference data may refer to at least one said data template representation by means of a unique reference identifier.

A said data template representation may describe a set of connection capabilities between a plurality of individual said pre-configured structures.

Preferably, each said reference data refers uniquely to a single instance of a said pre-configured structure.

The invention includes a management system for managing a network element comprising a plurality of physical resources arranged into a plurality of pre-configured structures each of a pre-configured structure type, said management system comprising data storage means storing:

at least one data template, said data template representing a said pre-configured structure; and a plurality of reference data, each said reference data referring to a said pre-configured structure and to at least one said data template.

Specific implementations of the present invention may enable an improved terminology for trail termination points.

In the one implementation according to the present invention, a connection function describing connections between a termination point in a self-layer and one or more termination points within a client layer is provided by means of a set of connection rules, so as to enable description of configurable connections between a plurality of ports.

Further, specific implementations according to the present invention recognize that within a self layer, a trail termination point is always bound to a set of adaptation rules for adapting the self layer of a transport protocol to an adjacent layer of a transport protocol, and that an adaptation of data signals between layers of a transport protocol is always bound to a trail termination point.

By providing a set of rules describing adaptation of data between protocol layers, and by coupling the adaptation rules to a set of rules describing exit and entry to a layer, a concise description of an internal architectural configuration of a network element may be achieved. A plurality of such descriptions may be referenced to each other by means of a set of inter end point connection rules to provide a complete network element template describing functionality capabilities and internal physical constraints of the network element.

Further, specific implementations according to the present invention may provide for inter port connection rules of high complexity, which are configurable per network element.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

In the following discussion, a best mode implementation of the invention is described with reference to synchronous digital hierarchy (SDH) systems. However, it will be understood that the scope of the invention is not restricted to SDH systems, but extends over any network of physical and logical resources in the telecommunications or computer networks domains, having a management information system. Networks operating asynchronous transfer mode (ATM), synchronous optical network (SONET), integrated service digital network (ISDN) and SDH are specific examples of such networks. However, the invention is not restricted to networks operating these specific protocols.

Within the following description, references are made to terms defined in International Telecommunications Union (ITU-T) recommendations G.803 and G.805. In this specification, definitions of terms according to recommendation G.805 are to take precedence over definitions of the same terms appearing in recommendation G.803.

Figure 1:
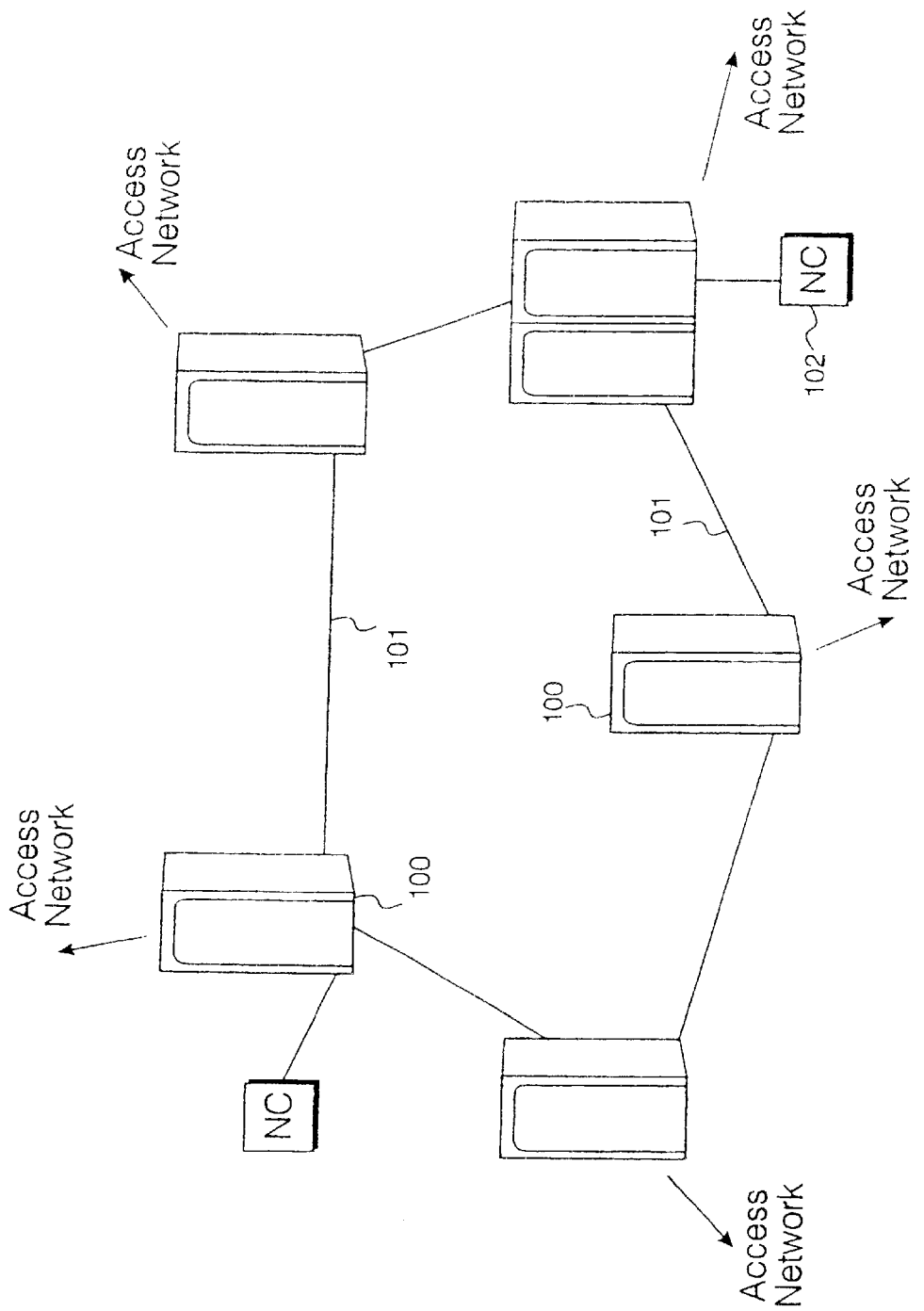
FIG. 1 illustrates a generic representation of a communications network.
Figure 2:
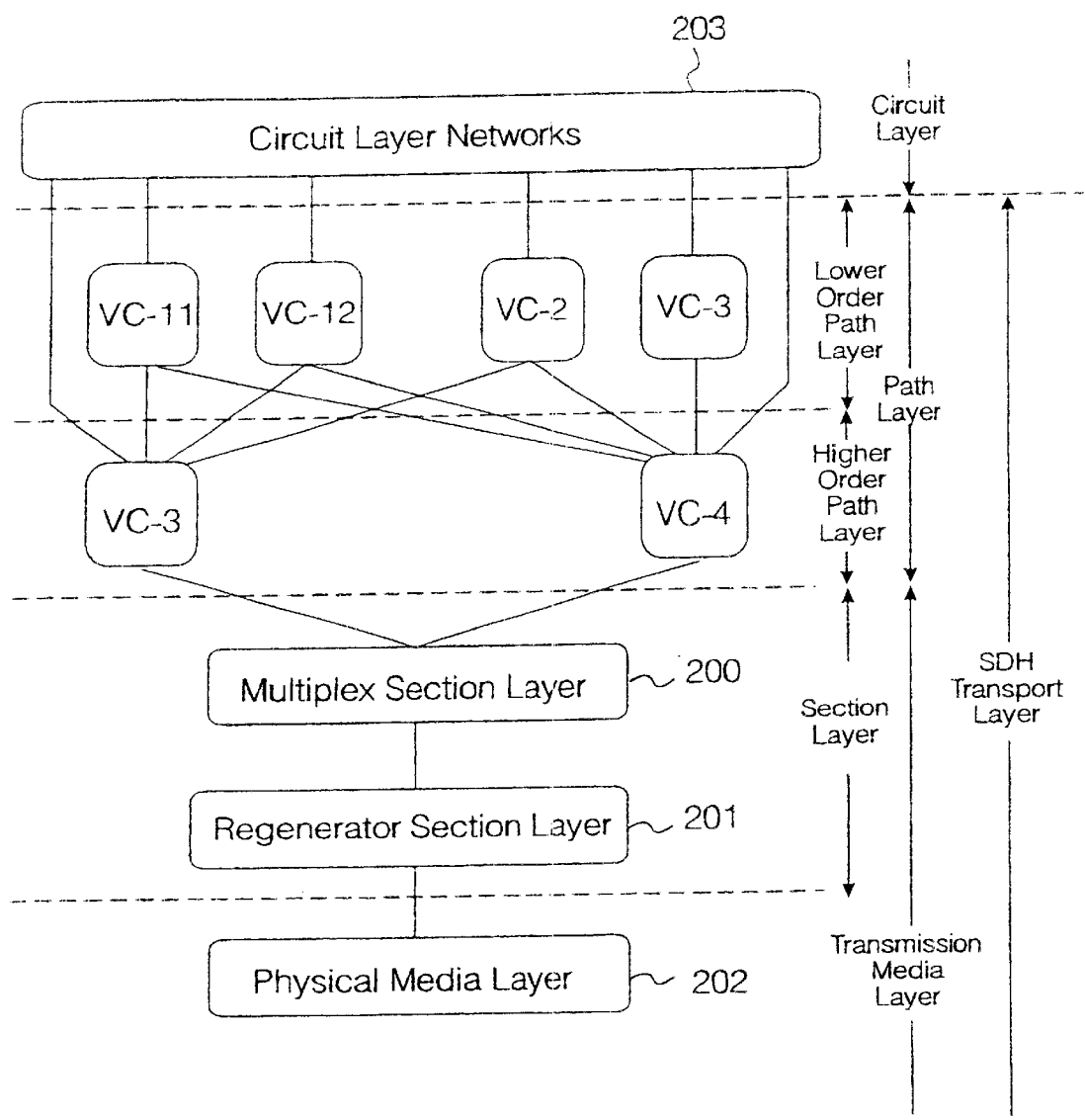
FIG. 2 illustrates a prior art representation of a synchronous digital hierarchy based transport layered model in accordance with International Telecommunications Union (ITU-T) recommendation G.803.

ITU-T recommendation G.803 deals with the architecture of SDH transport networks and defines an SDH based transport network layered model as illustrated in FIG. 2 herein. The G.803 model uses a functional approach to the description of architectures based on the concept of a number of SDH functional layers, and the concept of partitioning within a layer for defining administrative domains and boundaries. Physically, a conventional SDH network is constructed from a plurality of physical resources, for example network elements such as exchanges, multiplexers, regenerators, and cross connects. The network elements are connected together and provide a transmission media layer, including a section layer comprising a multiplex section layer 200, and a regenerator section layer 201, and a physical media layer 202. Circuit switched traffic is routed over the physical resources in a circuit layer 203 which is carried by the SDH transport layers.

Figure 3:
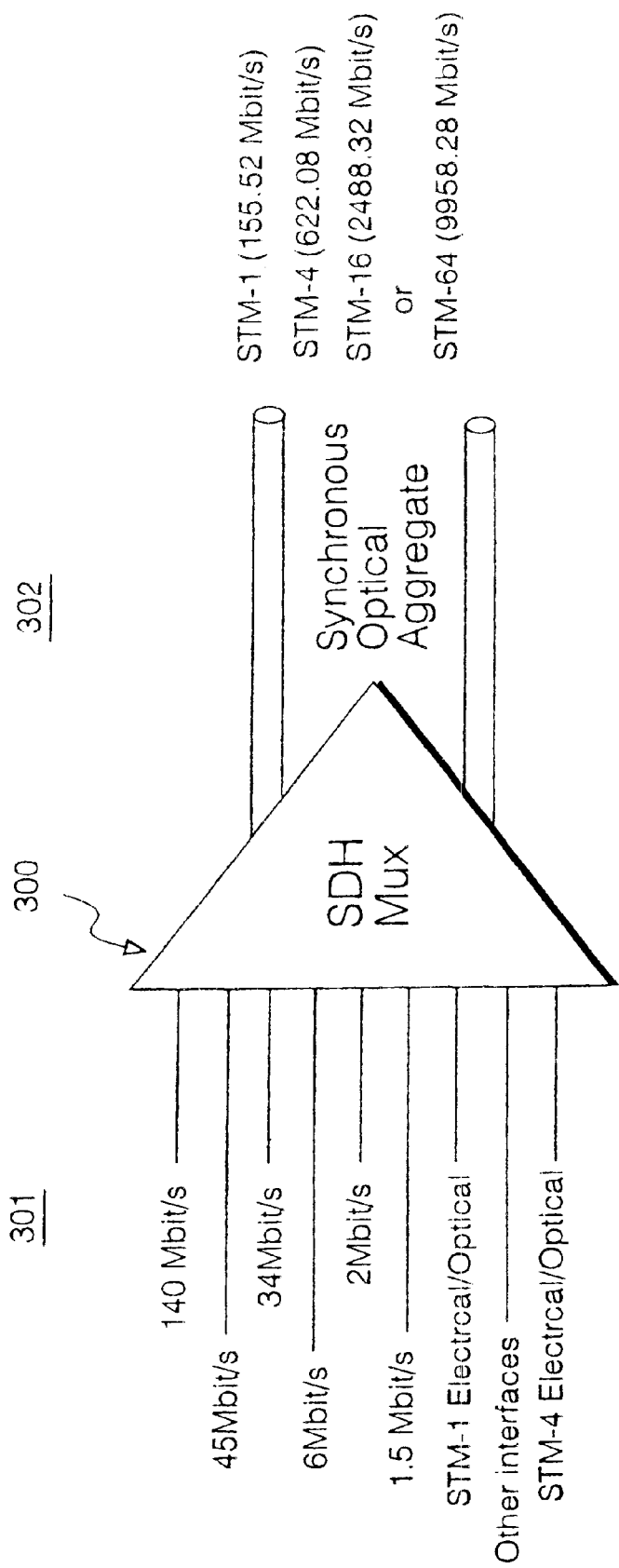
FIG. 3 illustrates schematically a prior art synchronous digital hierarchy multiplexer network element, illustrating connections to a plurality of tributary and aggregate layers.
Figure 4:
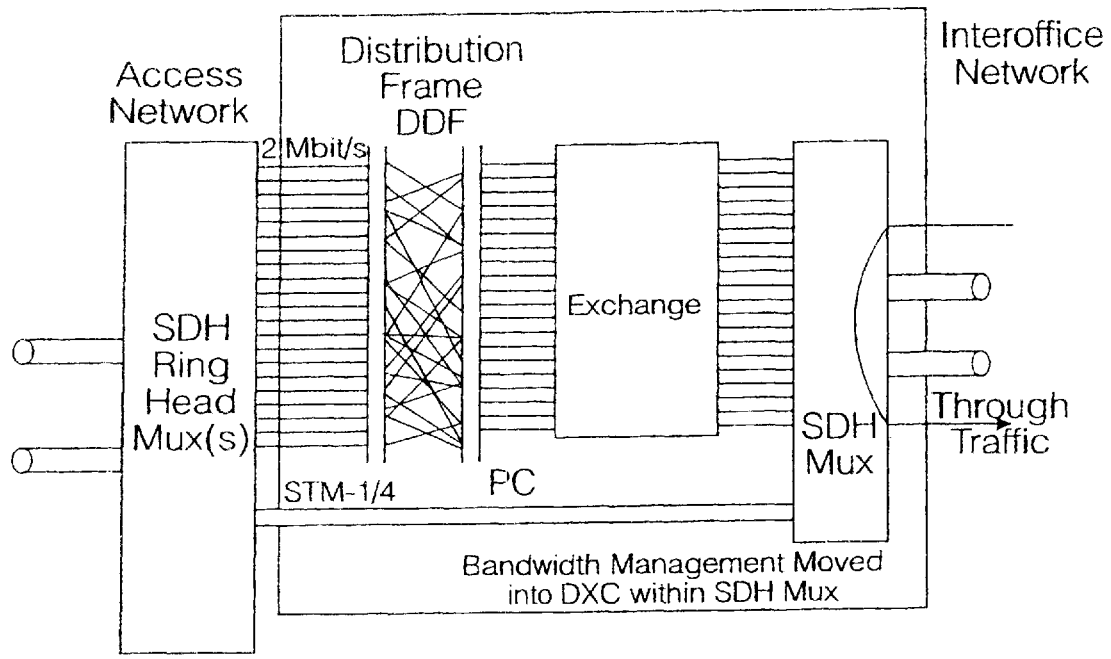
FIG. 4 illustrates schematically a prior art synchronous digital hierarchy central office network element.

Examples of prior art SDH network elements are illustrated schematically in FIGS. 3 and 4 herein. Referring to FIG. 3 herein, there is illustrated schematically a synchronous digital multiplexer element 300, forming a basic component of a known synchronous digital hierarchy network. By providing a multiplexer with a range of optional tributary interfaces 301, a single synchronous multiplexer can provide a wide range of access bitrates for a variety of needs, for example 1.5 Mbit/s, 2 Mbits/s, 6 Mbits/s, etc, such low bitrate access being multiplexed into a plurality of higher synchronous transfer mode aggregate rates 302, for example STM-4, STM-16 or STM-64. Prior art synchronous digital hierarchy networks may be assembled from a plurality of such multiplexer elements in a variety of different configurations, including add-drop, ring or hub configurations.

Tributary interfaces provide access to higher order transmission rates for exchanges. Exchanges are connected to each other using optical connections operating high bitrate synchronous modes. Subscribers access the SDH network using an access network which enters the exchanges and multiplexers using, for example 2 Mbits/s tributaries. An example of a known SDH exchange is illustrated schematically in FIG. 4 herein.

Data is carried between network elements which are geographically separated by large distances at relatively high data rates, eg 155 Mbits/s. Circuit switched connections, referred to as a circuit layer 203 in recommendation G.803 are transported across the SDH network by encapsulating bit streams comprising the circuit switched connections into different virtual containers (VCs) which are multiplexed together for transmission at higher order bit rates. The SDH transport layers comprise, in addition to the physical media layer and section layer, a plurality of higher order path layers, for example carried by virtual containers VC-3, VC-4, and a plurality of lower order path layers, for example carried by virtual containers VC-2, VC-3, VC-11, VC-12.

Figure 5:
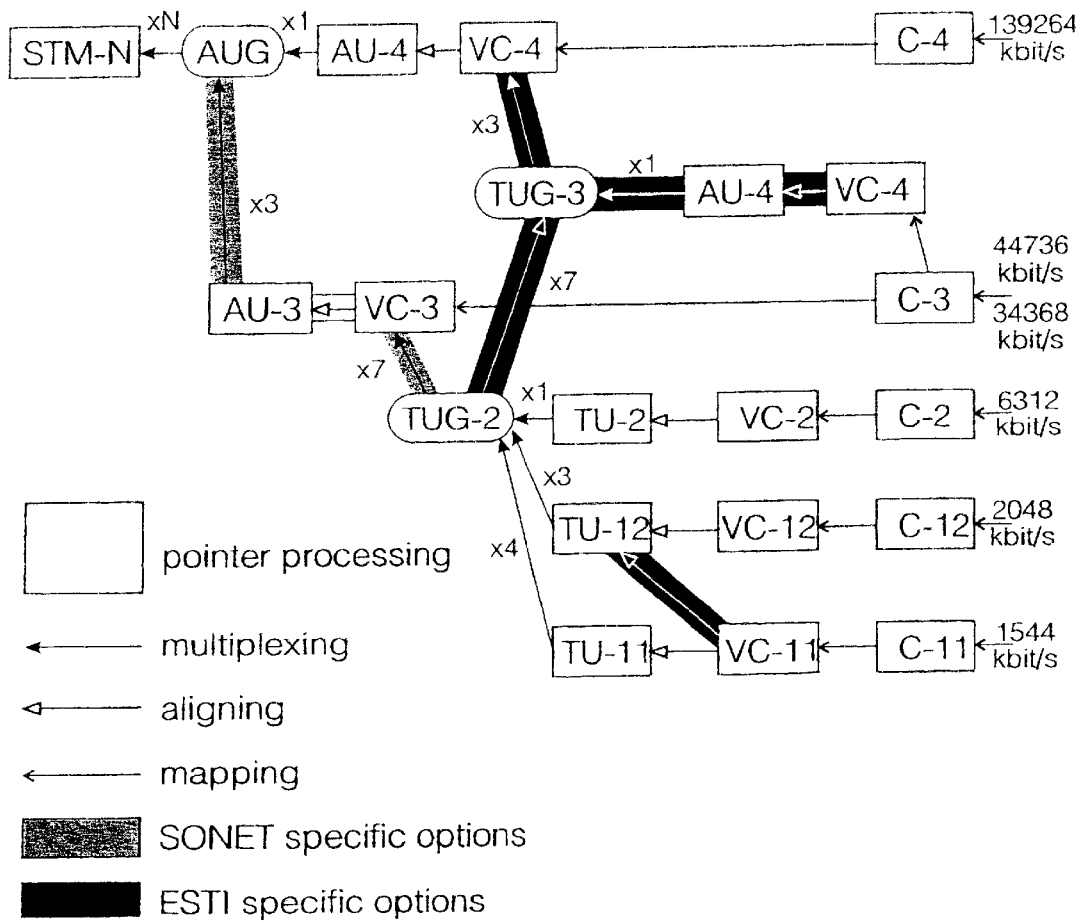
FIG. 5 illustrates schematically a prior art synchronous digital hierarchy layered multiplexing structure.

The SDH layered multiplexing structure is illustrated schematically in FIG. 5 herein, illustrating also synchronous optical network (SONET) multiplexing options, and European Telecommunications Standards Institute (ETSI) multiplexing options.

Within the physical resources, circuit switched traffic follows paths and trails at various multiplex levels. Connections are terminated at connection termination points, and trails are terminated at trail termination points within physical resources. For example, within a communications network, there may be a restricted number of network elements which are capable of processing voice data. Operations on voice data at a voice level may be performed within those particular network elements. However, to transport traffic data between those network elements, there must be further transmission, such as provided by the SDH virtual container system. Thus, where a voice connection is to be made between geographically disparate network elements A and B, the connection may be routed via intermediate network elements D, E, F, G etc which may be in the VC-12 layer. However, the VC-12 layer itself, to connect between intermediate network elements E, F may need to be multiplexed into a higher bitrate layer, eg the VC-4 layer.

Figure 6:
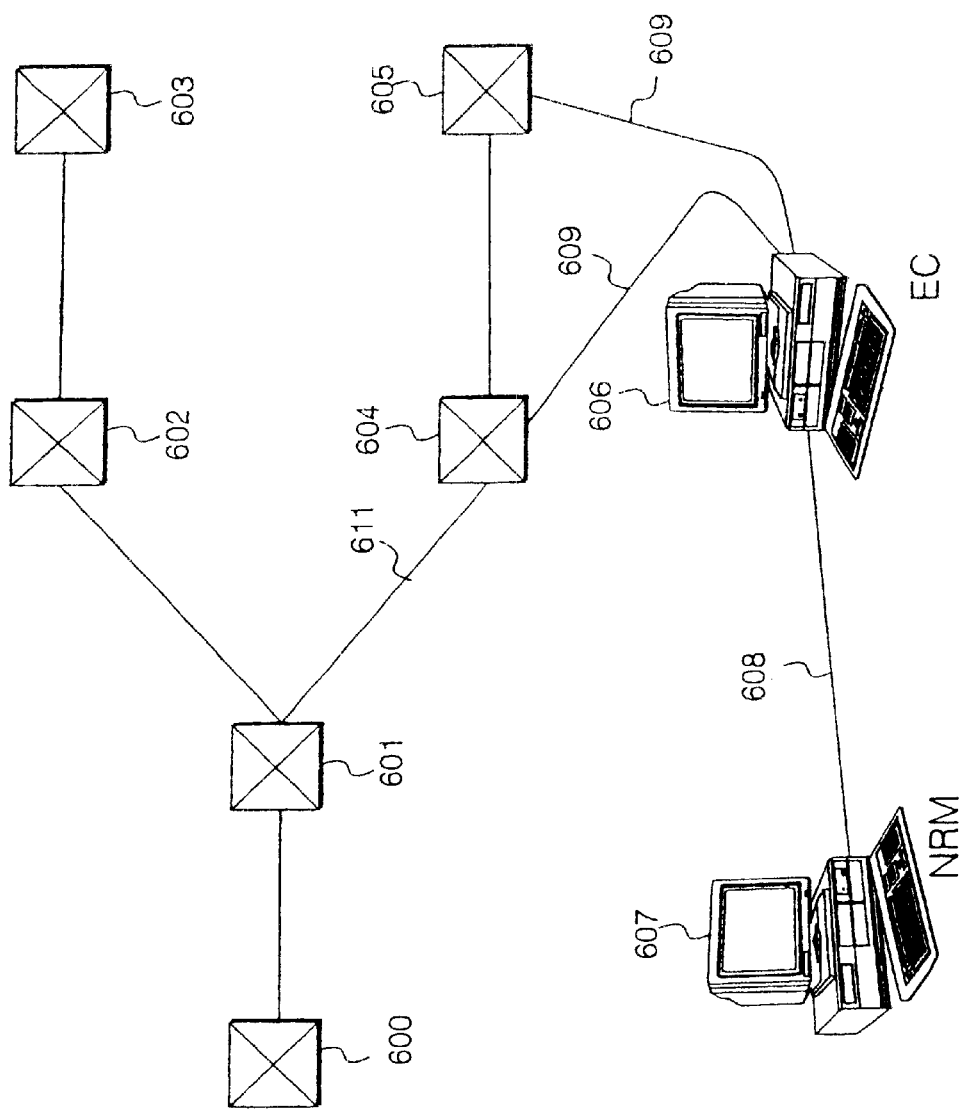
FIG. 6 illustrates an example of part of a communications network operating a network management system according to a first specific implementation of he present invention.

Referring to FIG. 6 herein, there is illustrated schematically a section of an SDH communications network comprising a plurality of network elements 600–605 operating under control of an element controller 606 and managed by a network manager 607 according to a specific implementation of the present invention. The element controller communicates with the plurality of network elements via a prior art network management protocol, for example the known common management information service element (CMISE) protocol 608 or the known Hewlett Packard Simple Network Management Protocol (SNMP), and the element controller communicates with the network manager 607 via a prior art protocol for example the known UNIX compatible external data representation (XDR), carried by the known transmission control protocol/internet protocol (TCP/IP) over transmission link 609. In the specific implementations described herein, templates and messages are transported using the known external data representation. However, the invention is not restricted to use of the known external data representation for this purpose, but may alternatively be implemented by a common object related broker architecture interface definition language (CORBA IDL), in ASN1-GDMO, in SNMP, JAVA, or C+ structure definitions. For clarity of explanation, the XDR implementation will be referred to in the best mode hereafter. The network manager 607 implements operations, administration and management of the network elements, through element controller 606.

Figure 7:
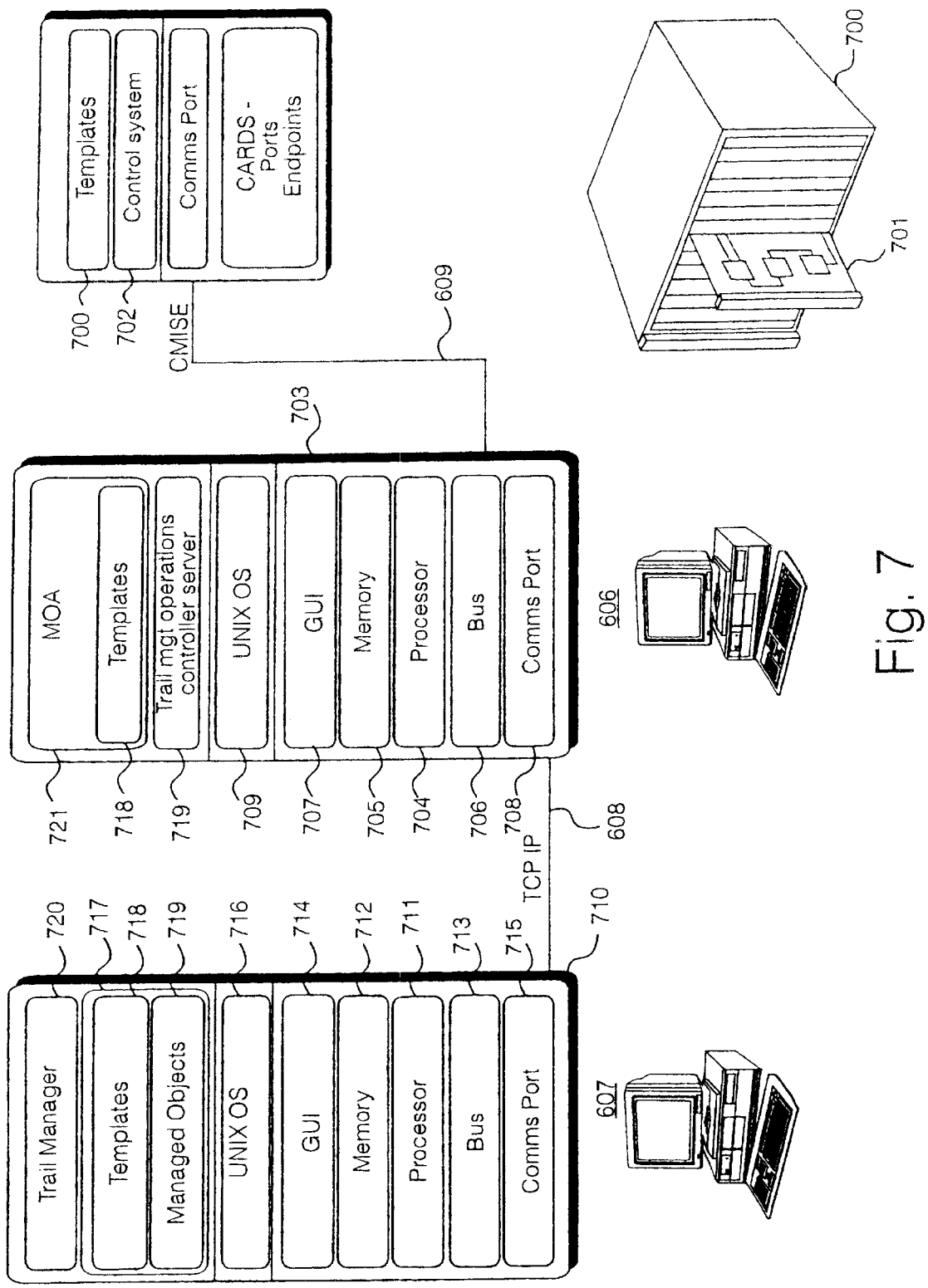
FIG. 7 illustrates schematically components and interconnection of a network element, element controller and network manager of the communications network of FIG. 6 herein.

Referring to FIG. 7 herein, there is illustrated schematically construction of a typical network element 700, element controller 606 and network manager 607. Network element 700, for example a multiplexer or cross connect, comprises a casing or cabinet having one or a plurality of shelves, each shelf containing a plurality of cards 701. The physical resources of the network element are carried on the cards 701. The cards contain processors, switch fabrics, line terminations etc depending upon the type of network element, and are connected to each other via a data bus. The physical resources are arranged into a set of pre-configured physical and logical structures. For example. A physical resource may comprise a physical port as will be described hereafter. A logical structure may comprise a logical port floating between cards, as will be described hereafter. A pre-configured structure may comprise a logical structure of connection capabilities between individual ports, as will be described hereafter. In the case of an SDH multiplexer, each card may support a number of physical ports. Each port supports a plurality of connections.

The network element is provided with a local control system 702 comprising a data processing capability configured to send and receive messages over the CMISE operations administration and maintenance channel 608 and providing control of network element functionality.

The element controller comprises a workstation 703, for example a Hewlett Packard 9000 series workstation comprising a processor 704, a data storage device 705, a bus 706 linking the processor and data storage device, a graphical user interface 707, and a communications port 708 for communicating with the network element and the network manager. Typically, the element controller operates according to a UNIX operating system 709.

The network manager 607 similarly may comprise a work station 710, eg Hewlett Packard 9000 series having processor 711, memory 712, bus 713, graphical user interface 714 and communications ports 715, operating in accordance with a UNIX operating system 716. The network manager and the element controller are configured to communicate with each other using for example TCP/IP link 608. The network manager comprises a managed object base (MOB) 717 containing data describing characteristics and configurations of the network elements under its management. Within the network manager, each network element is represented as a managed object, in accordance with the known telecommunications network management network (TMN) architecture of ITU-T recommendation M.3010. The managed object base comprises a database from which a plurality of network management applications resident on the network manager may source data describing the network, in order to perform network management operations, eg fault management, provisioning, and configuration operations.

According to the best mode implementation of the present invention described herein, there are provided a set of data templates representing the physical resources provided by the network elements. The templates 718 as will be described hereafter in this document, describe the capabilities and internal connectivities of one or a plurality of pre-configured structures, eg ports within the network elements. In general, network elements comprise a limited set of physical arrangements of hardware components, that is to say a limited set of pre-configured physical structure types are present in a network element or a family of network elements and can be represented by a limited set of data template types. Similarly, logical connectivities between physical pre-configured structures tend to repeat across a family of network elements, and can be represented by a limited set of data template types. Each different type of network element having its own particular capability and connectivity may be represented by a different set of template types.

In the specific implementation of the best mode herein, the element controller stores a plurality of templates describing the network elements and sends these to the network manager over communications link 608. Templates may be stored in the managed object base 717 in addition to the managed objects 719 configured according to the known TMN architecture. Optionally, each network element may store one or more templates describing its ports. Installation of templates describing a network element into the network element is left as an option for a manufacturer of the network element. The templates may be read by one or more applications resident on the network manager. One such application comprises a trail manager application 720 for managing creation, deletion and modification of trails across the network. The trail manager application is the subject of a separate patent application filed on the same day, and at the same government patent office as the present disclosure.

Within the element controller 606, a managed object agent (MOA) 721 implements management of the network elements according to instructions received from the network manager 607. The managed object 721 uses data of the templates to manage the network elements.

Figure 8:
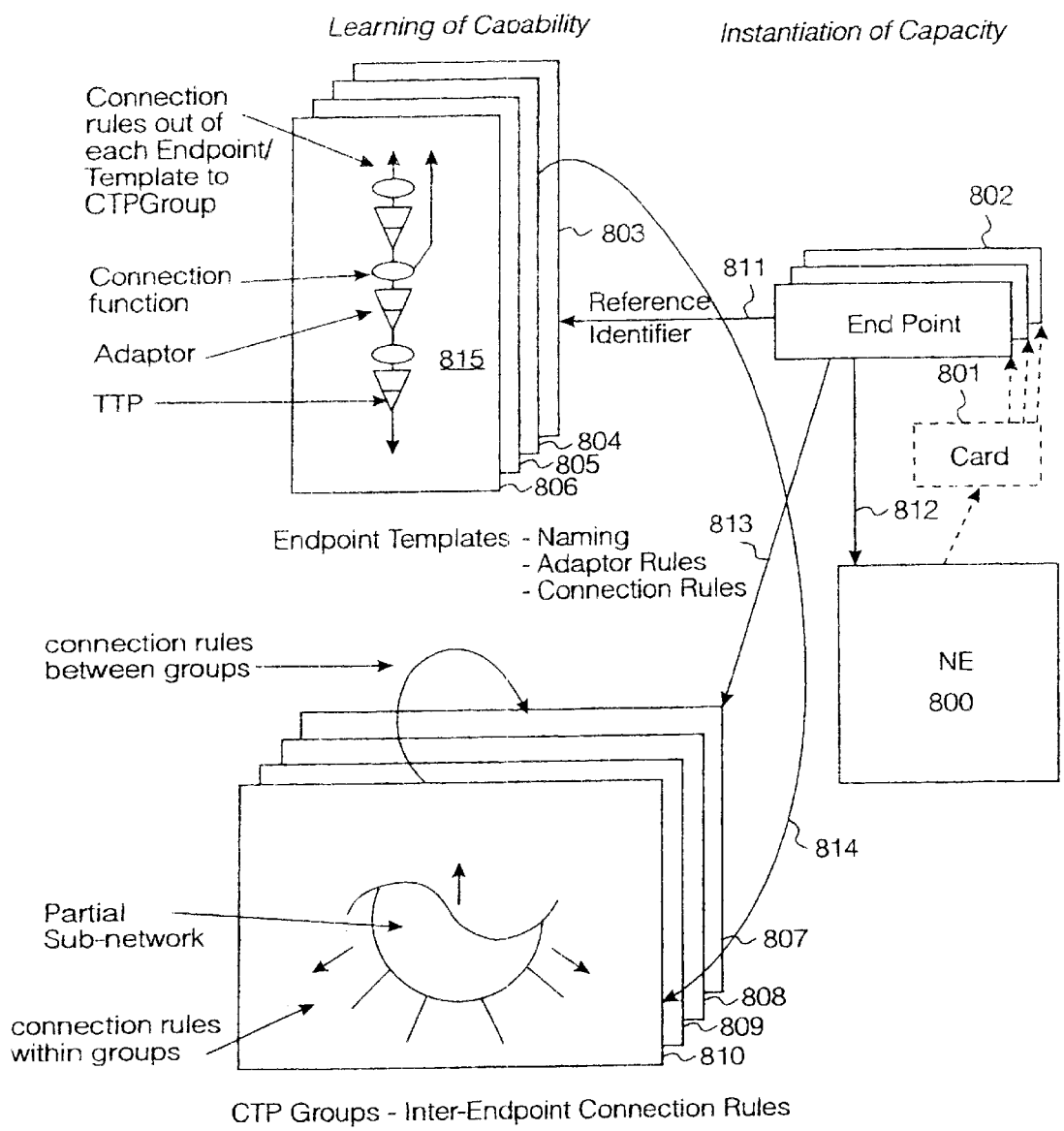
FIG. 8 illustrates schematically a network element, having a plurality of cards, the cards represented by a set of data templates according to a specific implementation of the present invention.

Referring to FIG. 8, herein there is illustrated a system for describing and communicating internal configuration and capabilities of a network element 800 using a set of data templates and messages. Network element 800 comprises a plurality of cards 801, each card having a plurality of physical and/or logical ports. A "port" is defined in recommendation G.805 as "a pair of unidirectional ports". A uni-directional port as defined in recommendation G.803

"represents the output of a trail termination source of a unidirectional link connection, or the input to a trail termination sink or unidirectional link connection". Logical ports exist within a network element and may have similar layer structures and characteristics as physical ports, but do not actually bind to any physical port externally to the network element. Logical ports may be bound to one card, or may float across a plurality of cards. The physical or logical ports of a card may all be of a same type, or several different types of port may be resident on a card, depending on the specific manufacture of the network element itself.

Each physical or logical port is represented in the specific implementation herein as a corresponding respective end point. In this specification, the term "end point" is used to describe a port comprising a receive port, and (optionally) a transmit port. Each port of the network element is described by reference to its own end point data 802 which is unique to the end point and is enrolled at the element controller by means of an end point message. The end point message comprises one or a plurality of end point data. The end point data comprises a reference data, which refers uniquely to one end point, and which refers to one or more data templates. A card has a plurality of end points, depending on how many physical and logical ports it has.

The templates are of two types: Firstly, a set of end point templates 803–806 describe individual port types. Secondly, a set of connection termination point (CTP) group templates 807–810 describe inter-connectivities between ports.

An end point data 802 of a port comprises a reference identifier 811 to an end point template, a reference identifier 812 to a port, and may comprise a reference identifier 813 to a CTP group template. An end point template, eg 805, may include a reference identifier 814 to a CTP group template.

Each end point template contains the following:

A layer tree 815 including all of the types of trail termination point with the number of instances of the end points associated with the end point template.

An instantiation naming relationship between trail termination points in the tree.

Adaptor rules for each trail termination point type in the tree.

Connection rules for each trail termination point type or derived connection termination point type in the tree.

A single end point template may represent a plurality of individual instances of end points. An end point template describes for a port a hierarchy of termination points and limited connection functionality within those termination points, which arrive at the element controller at the same time, and which are bound to a same set of hardware as the port, or which are activated by the arrival of an end point data for that port and which are bound into a same set of hardware.

Connectivity between individual end points is represented by the set of CTP group templates. CTP group templates contain inter-end point connection rules which supply the compatability and connectability rules for operation across a trail at each layer of the model. Relationships between ports within a network element are conveyed by CTP group templates. Different types of connection, eg unidirectional, bi-directional, which can be made between ports is described by the CTP group templates. The CTP group templates model physical limitations on inter-port connections, eg due to lack of buses, physical tracks, limited capacity, etc. Information contained in a CTP group template may be used by higher applications in the management system to determine whether a connection can be made or not.

The end point templates and CTP group templates are constructed from assembling a plurality of smaller templates each representing a trail termination point in a layer. Such data templates are referred to herein as "trail termination point templates" and contain data describing a trail termination point, adaptation nodes concerning adaptation of that trail termination point, a client layer, and rules describing connectivity of that trail termination point to other trail termination points within its layer (intra-layer rules), and also connection rules describing connectivity of that trail termination point to other layers (inter-layer rules).

Construction and content of the end point data, end point messages and data templates will now be described:

End Point Data

An end point data represents an instance of a port. Each end point data comprises a reference identifier to a corresponding end point template. A set of end point data of a card provides a set of reference identifiers to one or more end point templates. Each end point template describes a type of physical or logical port of the card.

An end point data comprises the following:

a list of locations of connection termination points of a port. A first location (primary location) relates to a receive port, and a second location (if present) relates to a transmit port. If any special supporting hardware is present in the port, the location of this hardware may be referenced by a third location. In the best mode herein, one location is listed, this being the primary location which is used to refer to the end point.

a reference identifier to an end point template (optionally) a reference identifier to a connection termination point group template a text string name of the end point as used on the element controller or at the network element. For example the G scheme number for the TN-16X, or the shelf/slot number of the TN-4X such as "301" naming scheme.

a text string user label for the end point.

End Point Messages

An end point message of a port contains the end point data of that port. End point messages are transmitted from the network elements to the element controller 606 over the operations administration and management channel 609. The end point messages comprise the end point data (one per each port instance) carried within a protocol used for the operations administration and maintenance channel, eg the prior art CMISE protocol. The end point messages are relatively short, and occupy relatively little data carrying capacity on the OAM channel. By transmission of end point messages over the OAM channel to enrol ports of a network element, by reference to existing end point templates stored at the element controller, significant reductions in enrol times for ports of network elements may be achievable compared with prior art management systems.

End Point Templates

Each end point template is written specific to a particular port type. A plurality of individual ports of a same type share a same end point template.

Within an end point template, a port is described in terms of its layer structure, eg SDH layers, and in terms of a plurality of termination points and adaptations, and the constraints on connectivity between layers within that port. Each end point template describes connectivity constraints between layers within a set of termination points which bind directly to a particular logical or physical port which the end point template describes. Connectivity between layers is described herein as vertical connectivity. Connectivity between different ports at a same layer is referred to herein as horizontal connectivity. A set of end point templates describes the capacity of a network element and any limitations on the capabilities of the network element.

An end point template may be implemented as a list of parameters, which are read by a parser in the network manager, and in the element controller. In the best mode herein, an end point template comprises a list of parameters identifying the end point template and a list of parameters describing a content of an end point.

An end point template comprises the following elements:

A plurality of trail termination point templates within the port. An end point template is constructed from one or a plurality of trail termination point templates as described with reference to FIG. 9 herein.

An end point template identifier parameter. The end point identifier uniquely identifies an individual end point template. Each end point template identifier comprises an end point template number, an end point template name and an endpoint template parser vintage parameter. The end point template number is unique to a specific end point template and describes details of the template, for example the type and version of the template. In a large network comprising a large number of different network elements, a large number of different port types may exist, each one having a unique end point template. Further, as ports are upgraded, existing templates may need to be upgraded. The end point template number and end point template name are specific to a particular template type and do not change once allocated to that end point template type. If a change to a template is necessary, then a new end point template having a new end point template identifier is produced. As end point templates are modified, the network manager and element controller may operate different parser versions to each other. The vintage parameter enables identification of the appropriate vintage of parser for use with the end point template.

A parameter identifying a directionality of the connection termination point. For example the parameter may specify whether direction is or is not applicable, whether the connection is bi-directional or unidirectional, whether a transmit port is unidirectional and whether a receive port is uni-directional.

a reference identifier to a list of CTP group templates associated with the end point.

a number of instances of connection termination points within the port.

A parameter describing a trail termination point template (struct xdr_tmcom_ttp_template) comprises a parameter describing details of a trail termination point; directionality of the trail termination point; a number of instances of the trail termination point; connection rules concerning connections to other trail termination points in a same layer; a list of adaptation rules for adapting between layers: a list of assembly rules and a list of connection rules for connecting the trail termination point to a client layer.

An example of a data structure describing a trail termination point template may be as follows:

```
struct xdr_tmcom_tp_details (
    xdr_tmcom_tp_type            tp_type;
    xdr_tmcom_tp_type_qualifier  tp_qualifier;
    xdr_tmcom_tp_sub_type        tp_sub_type_list< >;
);
```

-continued

```
struct xdr_tmcom_ttp_template (
    xdr_tmcom_tp_details
                       ttp_details;
    xdr_tmcom_directionality
```

Trail Termination Point (TTP) Template

Figure 9:
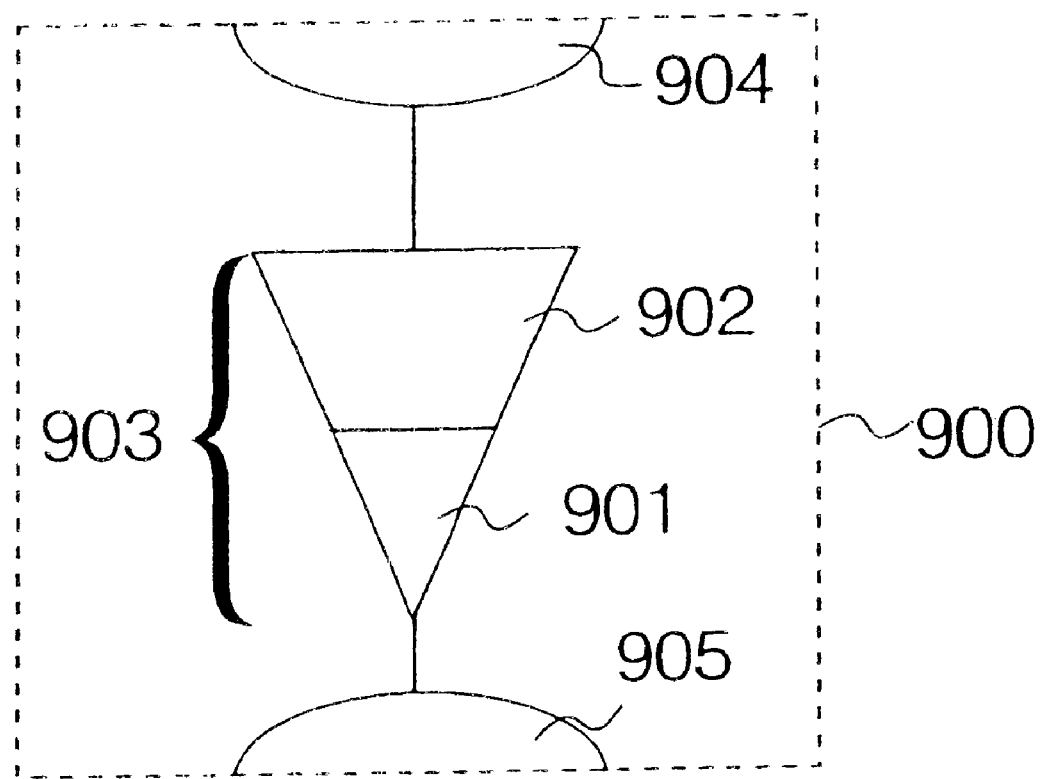
FIG. 9 illustrates schematically a trail termination point data template representation according to the specific implementation of the present invention.

Referring to FIG. 9 herein there is illustrated terminology for describing a trail termination point at a layer of a synchronous digital hierarchy network. An end to end trail may be described by assembling a plurality of such trail termination points. Although the example of FIG. 9 herein is described specifically with respect to a SDH environment, the naming scheme illustrated by FIG. 9 is applicable more generally to ports operating other protocols having terminations and layers. For example the North American Synchronous Optical Network (SONET) protocol, or the asynchronous transfer mode (ATM) protocol in which there are adaptation layers, virtual circuits and virtual paths.

In a naming scheme according to a specific method of the present invention, internal capabilities of physical resources of a communications network are described by way of a trail termination point template 900. A naming scheme for such a template is as follows:

Triangle symbol 901 represents a trail termination point, either bi-directional or uni-directional.

Quadrilateral symbol 902 represents an adaptation layer, either bi-directional or uni-directional.

Symbol 903, an irreducible composite of symbols 901 and 902, represents that an adaptation is always associated with a termination point.

Inverted semi-ellipse symbol 904 represents an entry connection function from a client layer into an adaptation represented by symbol 901.

Semi-ellipse symbol 905 represents an exit connection function from trail termination point 902.

The trail termination point template illustrated in FIG. 9 herein comprises an irreducable segment for describing a trail termination point within a port. The assembly of entry connection function 904, adaptation layer 901, trail termination point 902 and exit connection function 905 in the specific implementation herein recognizes a strict binding of functions represented by those symbols in a transport entity. In practice, these elements are always associated with each other and are never separate.

A plurality of trail termination point templates 900 as illustrated in FIG. 9 may be assembled together to provide a comprehensive definition of internal structure and capability of a network element. A plurality of trail termination point templates are assembled into an end point template as described previously herein for describing a port type. The end point templates are reusable, and may be referenced by a plurality of ports of a same type within a network element. Elements represented by symbols 901–905 in FIG. 9 are further detailed as follows: In the following, description of the elements 901–905 is made with reference to the XDR language in which the templates are carried in the specific implementation herein.

A trail comprises any circuit, line, path or section into which, at a first end, is inserted a data stream, and at a second end, is output the data stream. Within the trail, a data stream may be packaged into one or a plurality of frames or protocols, eg an STM frame, an ATM frame or a SONET frame. According to ITU-T recommendation G.803 a trail is defined as a "transport entity" in a server layer responsible for the integrity of transfer of "characteristic information" from one or more client network layers between server layer "access points". It defines the association between "access points" in the same "transport network layer". It is formed by combining a near end "trail termination" function, a "network connection" and a far end "trail termination" function. A trail termination point comprises an end point of a trail. According to ITU-T recommendation G.803 a trail termination is defined as a "transport processing function" which generates the "characteristic information" of a layer network and ensures integrity of that "characteristic information". The "trail termination" defines the association between the "access point" and "termination connection point" and these points therefore delimit the "trail termination". According to ITU-T recommendation G.805 a "trail" is defined as "a "transport entity" which consists of an associated pair of uni-directional trails" capable of simultaneously transferring information". A unidirectional trail is defined as "a "transport entity" responsible for the transfer of information from the input of a trail termination source to the output of a trail termination sink. The integrity of the information transfer is monitored. It is formed by combining trail termination functions and a network function. According to ITU-T recommendation G.805, a trail termination is defined as "a "transport processing function" that consists of a co-located trail termination source and synch pair". For example, a VC-12 trail comprises a route over which a VC-12 container envelope passes from source to destination, for example on entry to the VC-12 trail, the incoming data stream is packaged into a VC-12 envelope, and at the destination of the VC-12 trail, the data is recovered from the VC-12 container. A trail may traverse a plurality of physical or logical resources.

A trail termination point 901 is represented as an object. Attributes of such an object comprise:

- termination point type (tp_type)—this attribute defines the type of trail termination point, for example a physical media section termination point, a regenerator section termination point, an optical section termination point, a multiplex section termination point, or a higher order path termination point, layer;
- a termination point qualifier (tp_qualifier)—data which qualifies the "type" data. For example where the type of termination point is a physical media section termination point, this may be qualified by further specifying that the transmission medium is fiber. In other cases, there may be no qualifiers, in which case a null value is entered as a tp_qualifier attribute. In other cases, for example where the type is a higher path (HP) the qualifier may specify a VC4 layer;
- a termination point sub-type list (tp_sub_type<0>)—an attribute comprising an ASCII text field describing further subsidiary details about the type of termination point. This attribute is optionally filled, and a null value may be entered.

Adaptation element 902 comprises a set of adaptation rules describing adaptation between a self layer of a trail termination point and a client layer of the trail termination point.

Adaptation as represented by quadrilateral symbol 902 is defined generically in ITU-T recommendation G.805 as "a "transport processing function" that consists of a co-located adaptation source and synch pair". Adaptation is defined in recommendation G.803 as "a "transport processing function" which adapts a server layer to the needs of a client layer. The "adaptation" function defines the server/client association between the "connection point" and "access point" and these points therefore delimit the "adaptation" function. "Adaptation" functions have been defined for many "client/server" interactions".

Adaptation Rules

The layer tree in each end point template specifies the types of trail termination point associated with a specific end point. Each layer of the tree adapts to the other layers by means of a set of adaptation rules.

In the specific implementation herein, an example of a set of adaptation rules is represented by a set of parameters as follows:

```
struct xdr_tmcom_adaptation_rules (
    xdr_tmcom_mapping_group_id      mapping_group_id< >;
    xdr_tmcom_adapta-                adaptation_logic_list< >;
    tion_rules_logic_list
);
```

| Parameter | Legal Range |
| --- | --- |
| ctp_group< > | 0 for no parameter of default<br>1 or more ctp groups where rule requires this parameter |
| type_of_connections_allowed | 0 for no connection type or default<br>1 or more connection type where rule requires this parameter |
| specific_cp_name< > | 0 for no ctp or default<br>1 or more ctp where rules requires this parameter |
| list_of_valid_points< > | 0 where rule does not require points<br>1 or more where rule requires this parameter |
| specific_ttp_type< > | 0 for no ttp of default<br>1 or more ttp where rule requires this parameter |
| allowed_directionality | where it differs from the TTP |
| broadcast_limit | 1 where no broadcast |

```
struct xdr_tmcom_adaptation_rules_logic_list (
    unsigned long                   instances_of_mapping_com-
                                    ponent;
    unsigned long                   capacity< >;
    xdr_tmcom_mapping_group_id      mapping_component_structure;
    xdr_tmcom_tp_details            mapping-component_tp;
    xdr_tmcom_adapter_rule_operator
                                    relationship_to_next_rule)-
                                    in_logic_list;
);
```

| | |
| --- | --- |
| instances_of_mapping_component | number of instances of the mapping component currently being defined. |
| mapping_component_structure | describes the id of the mapping group which this layer adapts to. |
| capacity | This value should be set to NULL (empty list) for SDH. |
| mapping_component_tp | tp_details for this mapping component. |
| Relationship_to_next_rule_in_logic_list | logic operator describing the relationship between the current adaptor rule in this layer and the next (if any) adaptor rules in this layer. |

```
Enum xdr_tmcom_mapping_group_id (
    xdr_tmcom_null_mapping_group_id,
    xdr_tmcom_HP_VC4_TUGmap,
    xdr_tmcom_HP_VC3_TUGmap,
    xdr_tmcom_MS_AUGmap,
    xdr_tmcom_TUG2,
    xdr_tmcom_TUG3,
    xdr_tmcom_ATM_VPmap,
    xdr_tmcom_AUG
);
```

| Value | Description |
| --- | --- |
| 0 | Null mapping group |
| 1 | HP_VC4_TUGmap |

-continued

| | |
|---|---|
| 2 | HP_VC3_TUGmap |
| 3 | MS_AUGmap |
| 4 | TUG2 |
| 5 | TUG3 |
| 6 | ATM-VPmap |

```
enum xdr_tmcom_adapter_rule_operator (
    xdr_tmcom_null_adapter_rule_operator
    xdr_tmcom_OR
    xdr_tmcom_AND
;
```

A set of ends points referencing to a network element describe all the physical and logical ports available within that network element, ie the physical and logical resource capacity available in that network element, and for each end point, and end point template describes the vertical connectivity constraints of termination points of the corresponding port. End point templates describe intra-port connectivity and model inherent connectivity constraints within a port, eg as limited by hardware. Horizontal connectivity capabilities between different ports, at various different protocol levels is described by a set of inter end point connection rules specific to the network element. Such connection rules are referred to herein as CTP group templates.

CTP Group Templates

CTP group templates describe how end point templates are interconnected in terms of a set of connection rules. A set of end point templates, end point data and CTP group templates corresponding to a network element inter-relate with each other to give a detailed description of resources available within a network element, and the capabilities which they provide. The end point data, end point templates and CTP group templates describe all ports, including trail termination points at all layers within the ports. A single network element has one or a plurality of CTP groups. Each individual CTP group is represented as an instance of a CTP group template. A CTP group template comprises the following elements:

A CTP group identifier which is unique to a specific CTP group template and describes the type and version of the CTP group template. The identifier comprises a group_number parameter and a group_name parameter. The group_number and group_name parameters are unique to a particular CTP group template and are not changed once allocated to that template. If a new CTP group template is created, then a new template identifier is allocated to that template. The group_name parameter provides a meaningful description of the template, for example "TN4x-STM4_all endpoints_vers_1_1". Additionally, the template identifier comprises a vintage parameter (ctp_group_parser_vintage) which identifies the version of parser for which the CTP group template was written.

The inter end point connection rules describe:

connections between termination points of different ports at a same layer. Each connection termination point group comprises connection rules specifying connectivity of termination points at a same layer between different ports; and connections between groups of termination points at one layer and groups of termination points at other layers. Connections between termination points at one layer and termination points at other layers are described as a set of connection rules between groups of termination points.

Connection rules are used at the connection termination points to describe which layer(s) a current layer may connect to. The connection rule express relationships between adapted trail termination points, and other trail termination points of a compatible layer, both inside the end point template and outside the end point template as appropriate.

An example of a set of connection rules used in the specific implementation herein, various ones of which may be used internally within end point templates, and various ones of which may be used in CTP groups, externally of end point templates is as follows:

| Parameter | Comments |
|---|---|
| connection_rule | Rule for connectivity |
| rule_parameter_list | 0 for entries with no parameters, 1 for entries with parameters |

```
enum xdr_tmcom_connection_rule_name (
    xdr_tmcom_must_not_connect_to_
    ctp_in_group,
    xdr_tmcom_may_connect_to_any_
    ctp_in_group,
    xdr_tmcom_may_connect_to_any_
    ctp_on_one_to_one_basis_in_group,
    xdr_tmcom_use_ctp_group_rules,
    xdr_tmcom_must_connect_to,
    xdr_tmcom_must_not_connect_to,
    xdr_tmcom_may_connect_to,
    xdr_tmcom_must_be_connected,
    xdr_tmcom_may_connect_to_self,
    xdr_tmcom_broadcast_limit,
    xdr_tmcom_connects_externally,
    xdr_tmcom_reversion_supported,
    xdr_tmcom_reversion_always_enabled,
    xdr_tmcom_protection_switch_state_not_controllable,
    xdr_tmcom_protection_switch_always_auto,
    xdr_tmcom_protection_switch_always_manual,
    xdr_tmcom_supports_only_subnetwork_protection,
    xdr_tmcom_supports_only_path_protection,
    xdr_tmcom_supports_path_and_subnetwork_protection,
);
```

| connection rule name | parameter(s) from xdr_tmcom_rule_ parameter | comments |
|---|---|---|
| xdr_tmcom_must_not_connect_to_ctp_in_group | one or more ctp_group | If no group name then it assumes all groups that the end point belongs to |
| xdr_tmcom_may_connect_to_any_ctp_in_group | one or more ctp_group one or more specific_ctp_name AND/OR list_of_valid_points AND/OR type_of_connections_allowed | If no group name then it assumes all groups that the end point belongs to |
| xdr_tmcom_may_connect_to_any_ctp_on_one_to_one_basis_in_group, | one or more ctp_group one or more specific_ctp_name AND/OR one or more specific_ttp_type AND/OR list_of_valid_points AND/OR type_of_connections_allowed | If no group name then it assumes all groups that the end point belongs to |

-continued

| | | |
|---|---|---|
| xdr_tmcom_use_ctp_group_rules | — | Used in end point templates. Assumes that all ctp groups identified in the end point (template) should be used. If this rule is not states then the ctp group rules d not apply and connectivity is only possible in the end point. |
| xdr_tmcom_must_connect_to, | one or more specific_ctp_name AND/OR one or more specific ttp_type AND/OR list_of_valid_points AND/OR type_of_connections_allowed | Assumes that connection is a 1:1 for all payload elements adapted from the layer unless stated (ie may be stated in bulk at the layer or in detail in client layer terminology if in detail then all connections must be stated). More than one ctp can be stated for protected connections. Can be used between end points in special cases but normally used within end point templates. Valid points indicated to force specific connection orientation. |
| xdr_tmcom_must_not_connect_to | one or more specific_ctp_name AND/OR one or more specific_ttp_type AND/OR type_of_connections_allowed | |
| xdr_tmcom_may_connect_to | one or more specific_ctp_name AND/OR one or more specific_ttp_type AND/OR list_of_valid_points AND/OR type_of_connections_allowed | Assumes that connection is a 1:1 for all payload elements adapted from the layer unless sated (ie may be stated in bulk at the layer or in detail in the client layer terminology). Can be used between end points in special cases but normally used within end point templates |
| xdr_tmcom_must_be_connected | — | If several choices of connection (via other rules but one of the choices must be used). |
| xdr_tmcom_may_connect_to_self | — | Allows for uni-directional restrictions. Would be stated if a uni-directional connection could be performed between rx and tx of the same Connection Termination Point |
| xdr_tmcom_broadcast_limit | broadcast_limit | If unidirectional connctiona then should be 1 unless broadcast is allowed in which case this will be limit unless no limit in which case should be set to maximum value |
| xdr_tmcom_connects_externally | — | Goes outside this NE (only for PMS). |
| xdr_tmcom_reversion_supported | connection type, connection points, directionally | allows the MOA to indicate that a particular CTP group or end point can support revertive connections. Connection points parameter used to distinguish between a switch and b switch if necessary. |
| xdr_tmcom_reversion_always_enabled | connection type, connection points, directionality | only used in conjunction with reversion_supported, allows the MOA to indicate that a particular CTP group or end point can support revertive connections. Connection points parameter used to distinguish between a switch and b switch if necessary. |
| xdr_tmcom_protection_switch_state_not_controllable | connection type, connection points, directionality | allows the MOA to indicate that a particular CTP group or end point does not support control of a protection switch position. Only used where connection type could support protection. Connection points parameter used to distinguish between a switch and b switch if necessary. |
| xdr_tmcom_protection_switch_always_auto | connection type, connection points, directionality | allows the MOA to indicate that a particular CTP group or end point only supports automatic protection switching (not manual). Only used where connection type could support protection. Connection points parameter used to distinguish between a switch and b switch if necessary. |
| xdr_tmcom_protection_switch_always_manual | connection type, connection points, directionality | allows to MOA to indicate that a particular CTP group or end point only supports manual protection switching (not auto). Only used where connection type could support protection. Connection points parameter used to distinguish between a switch and b switch if necessary. |
| xdr_tmcom_supports_only_sub network_protection | — | |
| xdr_tmcom_supports_only_path_protection | — | |
| xdr_tmcom_supports_path_and_subnetwork_protection | — | |

```
struct xdr_tmcom_rule_parameter (
    xdr_tmcom_ctp_group_id        ctp_group< >;
    xdr_tmcom_connection_type     type_of_connections_
                                  allowed< >;
    xdr_tmcom_universal_location  specific_ctp_name< >;
    xdr_tmcom_connection_points   list_of_valid_points< >;
```

-continued

```
xdr_tmcom_tp_details        specific_ttp_types< >;
xdr_tmcom_directionality    allowed_directionality< >;
long                        broadcast_limit;
);
```

An example of parameters describing a list of CTP groups may be as follows:

```
struct xdr_tmcom_ctp_group_list (
    xdr_tmcom_ctp_group_id    ctp_group;
    unsigned short            instance_of_ctp_group;
);
```

The template set of the specific implementation herein may have a number of advantages over prior art ways of describing network elements as follows:

Firstly, within recommendation G.774, individual transport layers tend to be floated, so that they are not specifically numbered to any particular port in a network element. However, the specific implementation herein provides a method of linking transport layers.

Secondly, in the abstract syntax notation one (ASN1) model relationship in ITU-T recommendation X.208, models are described by data specification. In contrast, in the present specific implementation, models are prescribed by way of specific inheritance.

Figure 10:
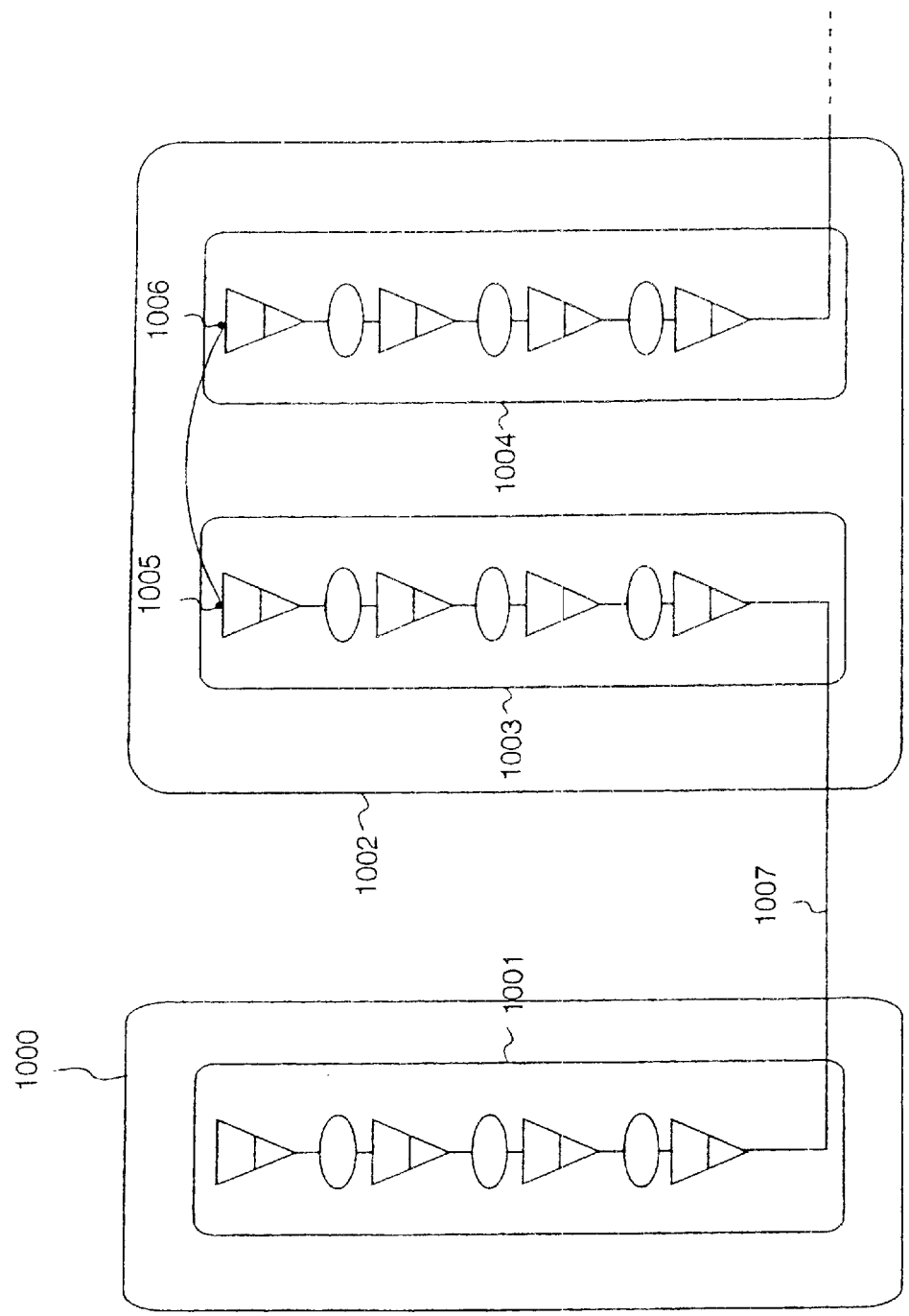
FIG. 10 illustrates schematically an example of a data template representation of ports of first and second network elements according to the specific implementation of the present invention.

Referring to FIG. 10 herein, there is illustrated a simple example of how a first port 1000 of a first network element is represented by a first end point template 1001, and second and third ports of a second network element 1002 are represented by second and third end point templates 1003, 1004 respectively and how connectivities between the three ports are represented.

Connection termination points 1005, 1006 at each of respective second and third end points 1003, 1004 are illustrate. Each of the end point templates 1001, 1003, 1004 comprise assemblies of trail termination point templates at different layers within a port as described with reference to FIG. 9. Each end point template type describes a different type of pre-configured structure within a network element, eg a physical port type, or a particular logical port type. Interconnectivity between different network elements is catered for by an external connection rule identified schematically as link 1007 in FIG. 10.

Figure 11:
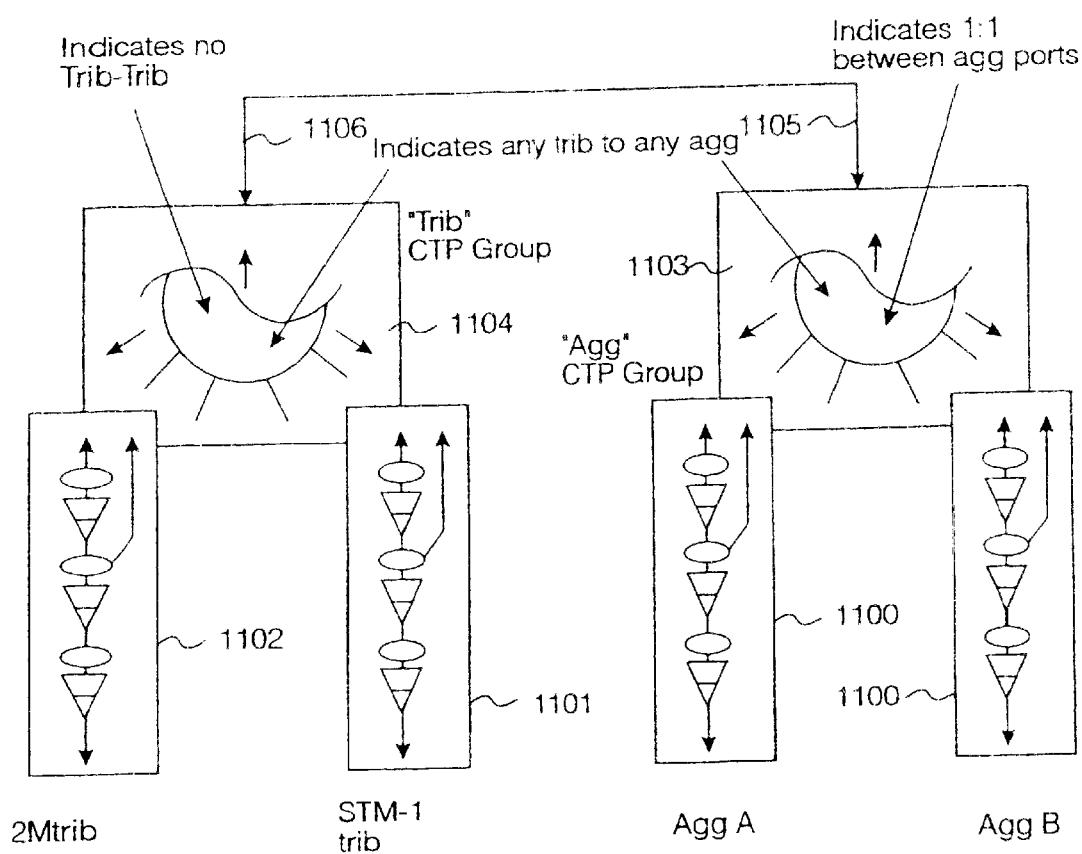
FIG. 11 illustrates schematically an inter-relationship between first and second sets of connection rules according to the specific implementation of the present invention, each set of connection rules representing connectivity between ports of a network element.

Referring to FIG. 11 herein, there is illustrated schematically a relationship between connection termination point groups and end point templates for a plurality of ports of a single network element. FIG. 11 shows a relationship between 4 individual ports. In practice, a network element may have many more ports. The network element comprises first and second aggregate ports AggA, AggB respectively, each of which are represented by a separate instance of a common aggregate template 1100, an STM-1 tributary port represented by an STM-1 tributary end point template 1101, and a 2 Mbits/s tributary port represented by 2 Mbits/s tributary end point template 1102. The representation of FIG. 11 of the AggA and AggB end point template represent instances of enrolment of ports AggA and AggB. Ports AggA and AggB share a common single aggregate end point template 1100. The STM tributary port enrols with STM-1 tributary end point template 1101 and the 2 Mbits/s tributary port enrols at element controller 606 with 2 Mbits/s tributary end point template 1102. End point data representing ports AggA and AggB also include a reference identifier to a first CTP group template (Agg CTP group) 1103. End point data referring to the STM-1 tributary port and the 2 Mbits/s tributary port include reference identifiers pointing to a second CTP group template 1104 (trib CTP group). In this example, the trib CTP group 1104 may include a connection rule which specifies that no port enrolled with the trib CTP group 1104 can connect to any other port also enrolled with the trib CTP group 1104, and contains a second rule specifying that any port enrolled with trib CTP group 1104 may connect with any port enrolled with Agg CTP group 1103. This connection rule is indicated by single-ended arrow 1105 in FIG. 11. Agg CTP group 1103 includes a connection rule within the group indicating that a 1:1 connection between any ports within the Agg CTP group is permissable. Also, Agg CTP group 1103 contains a connection rule specifying that any port enrolled with Agg CTP group 1103 can connect on a 1:1 basis with any port enrolled in trib CTP group 1004 (indicated by arrow 1106). Thus, for the example shown in FIG. 11 no connections are available between ports enrolled with the trib CTP group, 1:1 connections are available for ports enrolled with the Agg CTP group 1103, and any port enrolled with the Agg CTP group 1103 can connect with any port enrolled with the trib CTP group 1104. This combination of end point templates and CTP group templates represents the multiplexer network elements connectivity within the network management system. Thus, an external application, eg an auto router may use the template representation stored in the network management system to learn about the capabilities of the multiplexer network element having AggA, AggB, STM-1 tributary and 2 Mbits/s tributary ports.

Referring to FIGS. 12 to 18 herein, there will now be described an example of a single end point template for a STM-4 tributary port for a type TN4X multiplexer network element. The STM-4 tributary port comprises one of a plurality of ports within a multiplexer.

Figure 12:
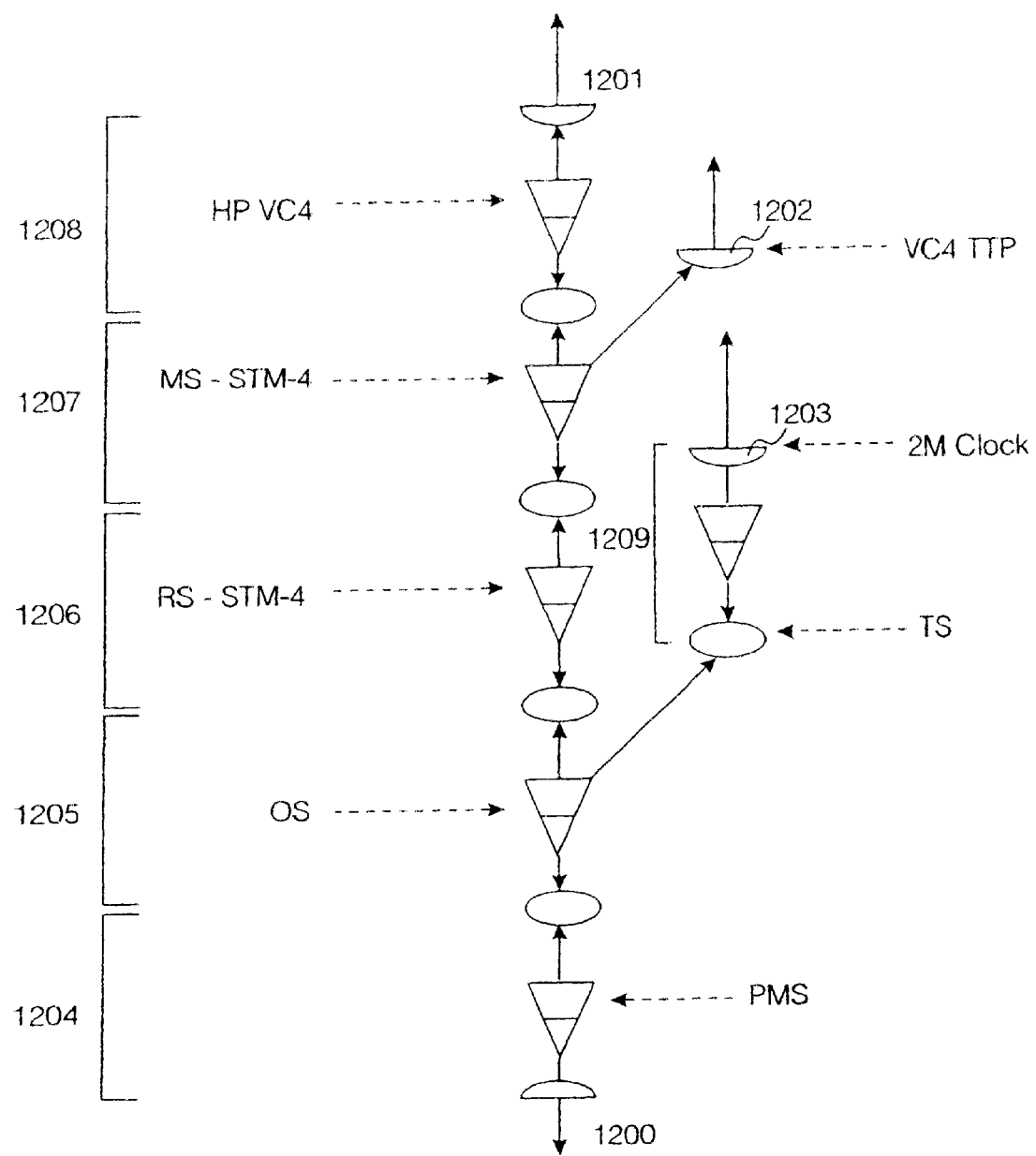
FIG. 12 illustrates schematically a data template representation of a port of a network element according to the specific implementation of the present invention, illustrating representation of different protocol layers within the port.

In FIG. 12, an end point template comprises a plurality of trail termination point templates connected to each other in accordance with connection rules as hereinbefore described. Each trail termination point template represents an instance of a termination point within a layer of a protocol. Capabilities of a port are represented by representing the trail termination points at different layers in that port by an assembly of TTP templates. One TTP template represents an instance of a trail termination point within a port. In FIG. 12, a first end point 1200 represents a connection to a physical media section layer in an SDH environment. A second end point 1201 represents a connection termination point to a higher path virtual container for (HP VC4) layer.

Trail termination points are represented by triangles, layer adapters are represented by quadrilaterals, and connection termination points between layers are represented by semi-ellipses as described with reference to FIG. 9 herein.

A trail termination point to a VC4 layer is described by connection rules represented by a semi-ellipse 1202 as shown in FIG. 12, and access to a 2 MHz clock is described by connection rules represented by inverted semi-ellipse symbol 1203. Trail termination points at the physical media section, optical section, regenerator section STM-4 level, multiplex section STM-4 layer and higher path VC4 layer are represented by corresponding respective trail termination point templates 1204–209. The optical section 1205 may access a tributary section 1209 via connection rules 1210, allowing access to the optical section by a 2 Mbits/s tributary.

In FIGS. 13 to 18, there is illustrated a set of TTP templates comprising the end point template of FIG. 12 coded in external data representation (XDR) language. In the best mode herein, XDR allows platform independence of data templates as between the network manager and the element controller.

Figure 13:
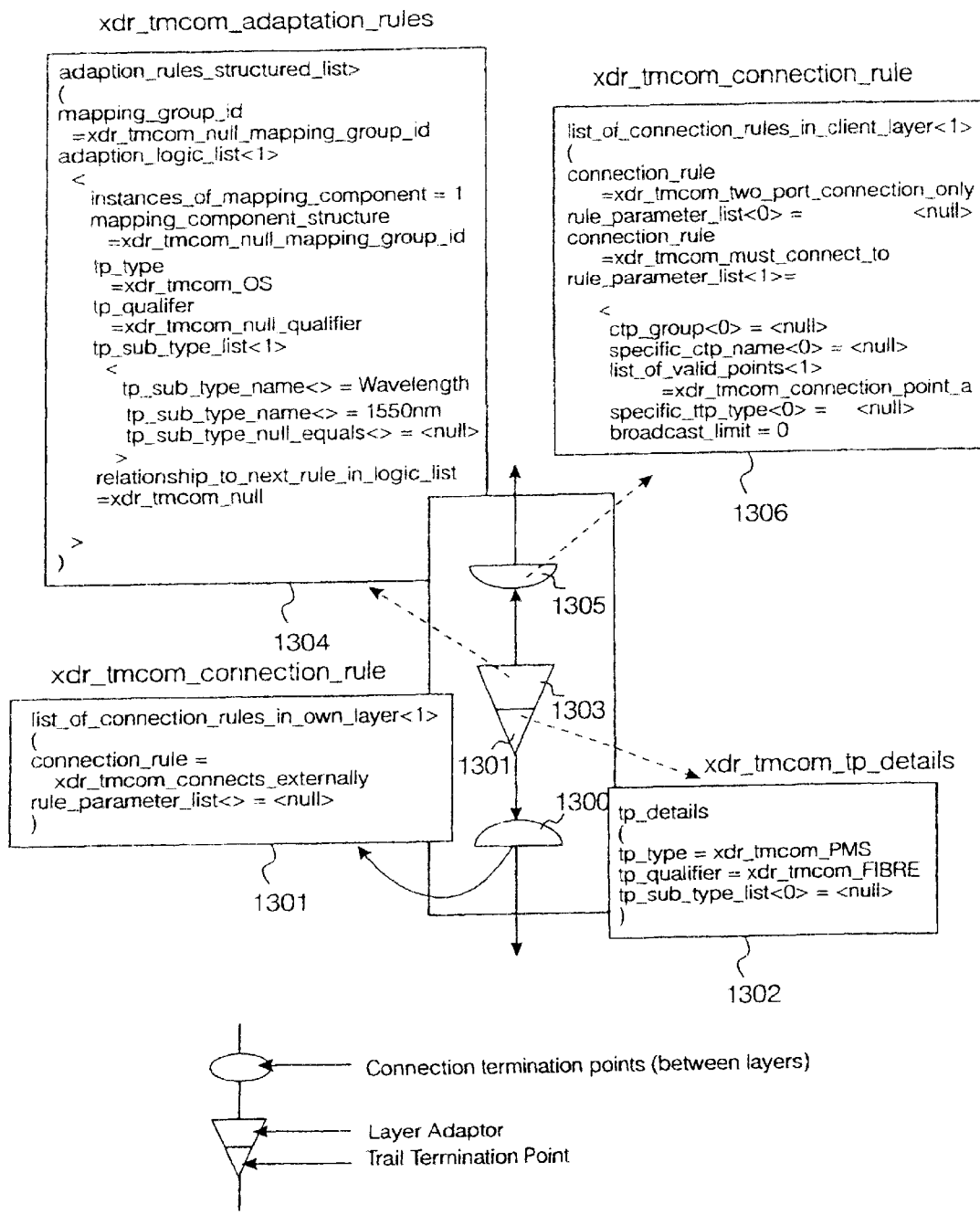
FIG. 13 illustrates schematically a data template representation of a trail termination point at a physical media section layer of a SDH port as shown in FIG. 12.
Figure 14:
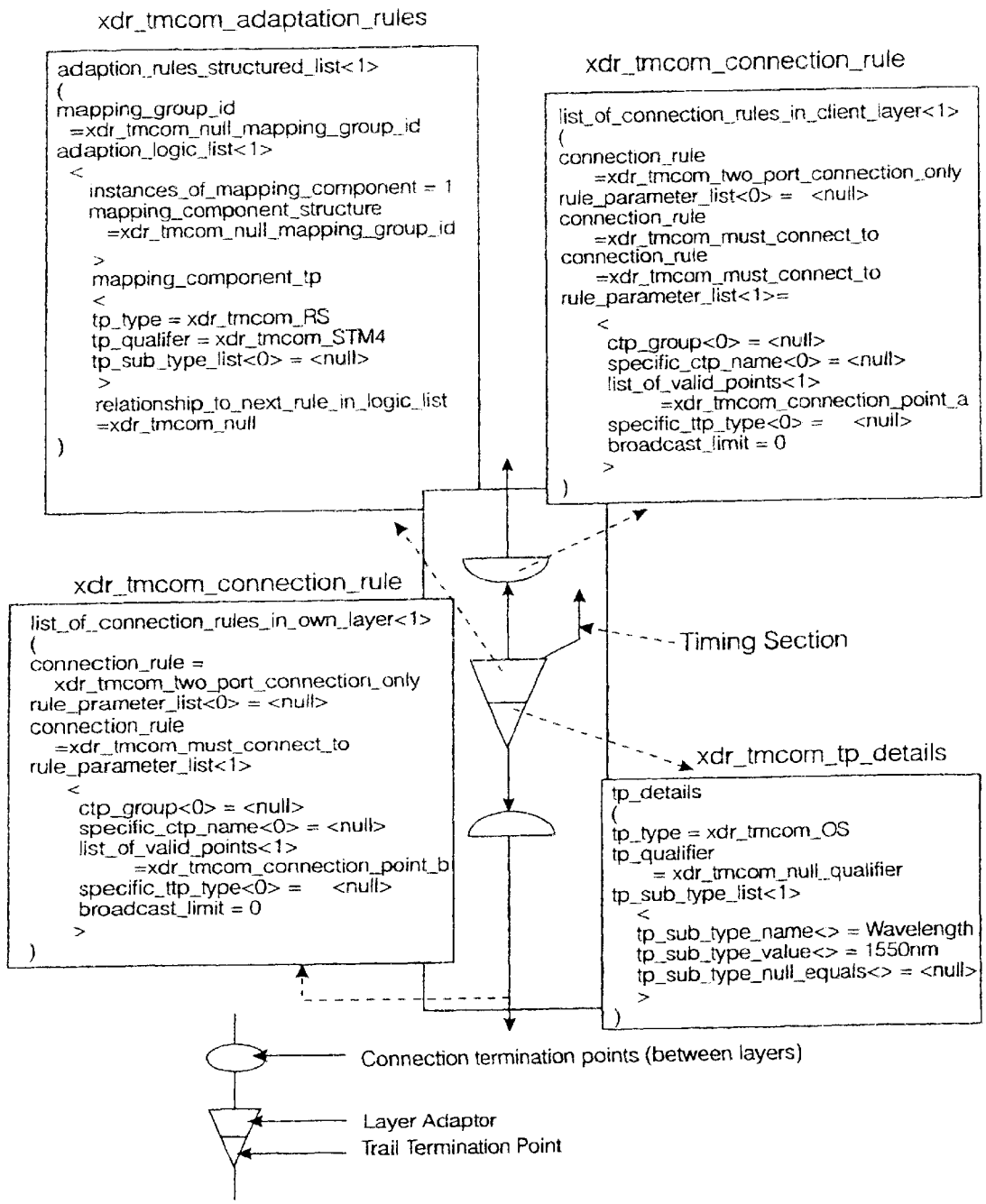
FIG. 14 illustrates a data template representation of a trail termination point at an optical section layer of the SDH port as shown in FIG. 12.
Figure 15:
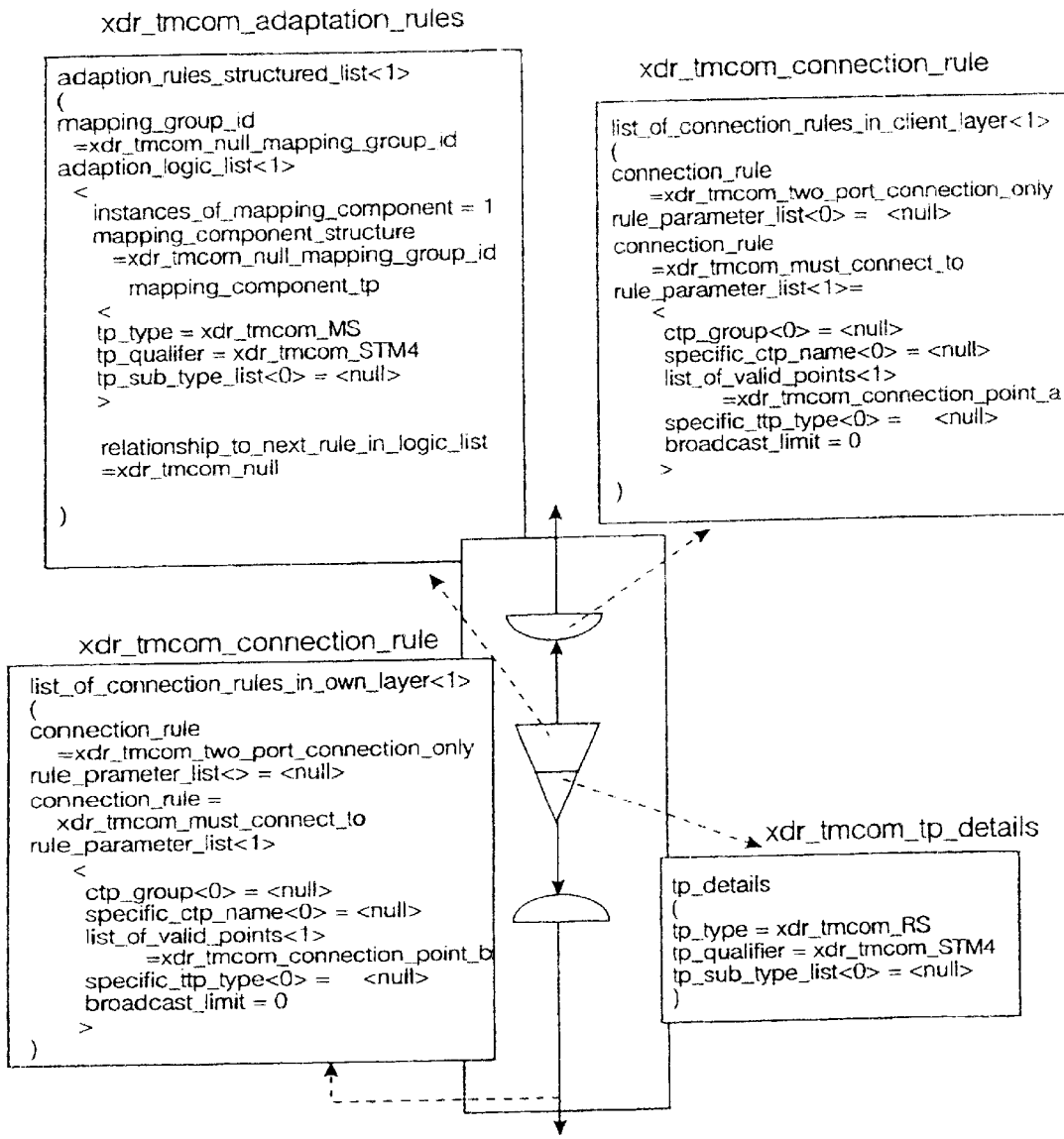
FIG. 15 illustrates a data template representation of a trail termination point at a regenerator section layer of the SDH port as shown in FIG. 12.
Figure 16:
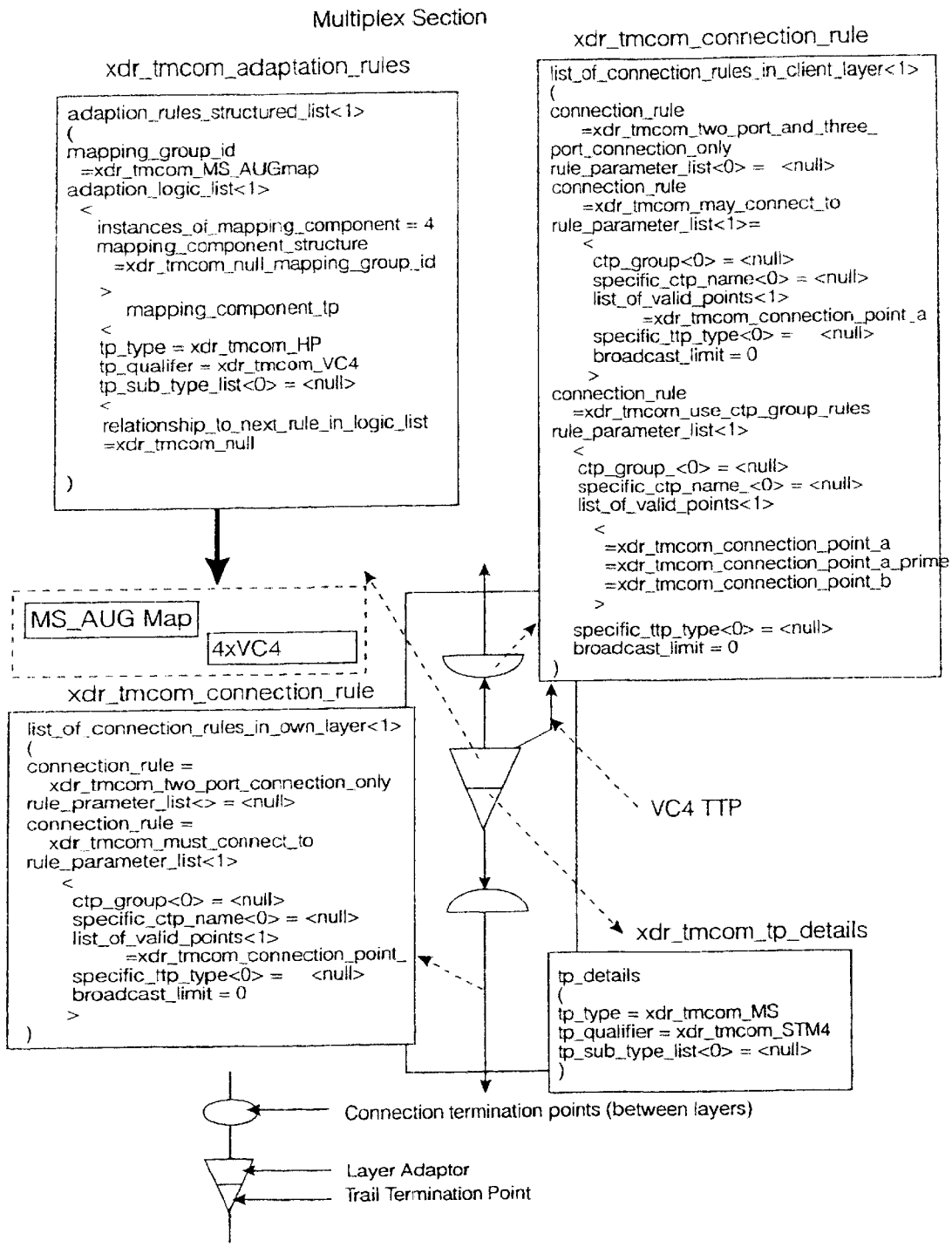
FIG. 16 illustrates schematically a data template representation of a trail termination point at a multiplexed section layer of the SDH port as shown in FIG. 12.

Referring to FIG. 13 herein, there is illustrated an example of a trail termination point template of a trail termination point of a port at a physical media section layer. Connection rules represented by semi-ellipse 1300 comprise rules describing external connection of the physical media section to other ports in a same layer, ie in the physical media section layer. A trail termination point of the port at the physical media section, represented by triangle symbol 1301 is described by trail termination point data parameters 1302. Detail parameters specify a layer of the termination point as a physical media section layer and that the termination point is connected to fiber transmission medium. Adaptation between the physical media section layer and a higher client layer as represented by adaptation quadrilateral symbol 1303, is described by a set of adaptation rules 1304.

Connection rules represented by inverted semi ellipse 1305 comprise rules specifying connection to other termination points in a client layer, other than the own layer of the termination point represented by triangle symbol 1301.

A connect_extemally rule within connection rules 1300 represents a special case connection rule which extends outside the end point template and represents a connection between a port represented by the data template and one or more other ports.

Termination point data 1302 includes an sub_type_list field comprising a set of ASCII characters for containing additional parameters and type details of the termination point. Such additional characters may describe that the termination point supports a path trace capability. This may be included as for example path_type=pathtrace and parameter_value=supported_16 bytes or similar parameters. Trail termination point data 1302 comprises a complete definition of the trail termination point. Any special characteristics of the trail termination point other than its layer are described in the sub_type field. The data describing the termination point stored in the sub_type field represents features of the port which describe its capabilities. For example a capability may be supporting the path trace functionality. An external application using the termination point data 1302 for planning a service may use the capability information described in the trail termination point data to check for compatibility of connectivity between different ports. For example if a first end point template type shows a trail termination point supporting a path trace function, but a second end point template type shows a termination point not supporting path trace, then an external management application may be able to determine that the first and second end point template types are incompatible with each other in respect of the path trace capabilities supported by one end point template, but not the other.

Adaptation rules 1304 describe which other termination points the trail termination point (physical media section fiber trail termination point) is capable of mapping to. In the specific implementation described herein, using an XDR message set, adaptation rules 1304 comprise a logic list (adaptation_logic_list), the function of which is described with reference to FIGS. 17 and 18 herein. Whilst in the specific implementation shown herein the message set used is UNIX XDR, the termination point data 1302, own layer connection rule data 1301, client layer connection rule data 1306 and adaptation rule data 1304 are independent of the message set used, and in other implementations may be encoded in the known CORBA interface description language (IDL) or the known ASN1-GDMO message set.

Client layer connection rules 1306 provide a set of rules describing connection of the termination point to a client layer. Client layer connection rules 1306 are arranged in a similar structure to own layer connection rules 1301 in layout, and specify connection termination point groups to which the termination point may belong (ctp_group), (specific_ctp_name). Within the same end point template as shown in FIG. 12, there are own layer connection rules of a higher trail termination point template (optical section trail point template 1205) which correspond with the client layer connection rules 1306 of the physical media section trail termination point template of FIG. 13.

Figure 17:
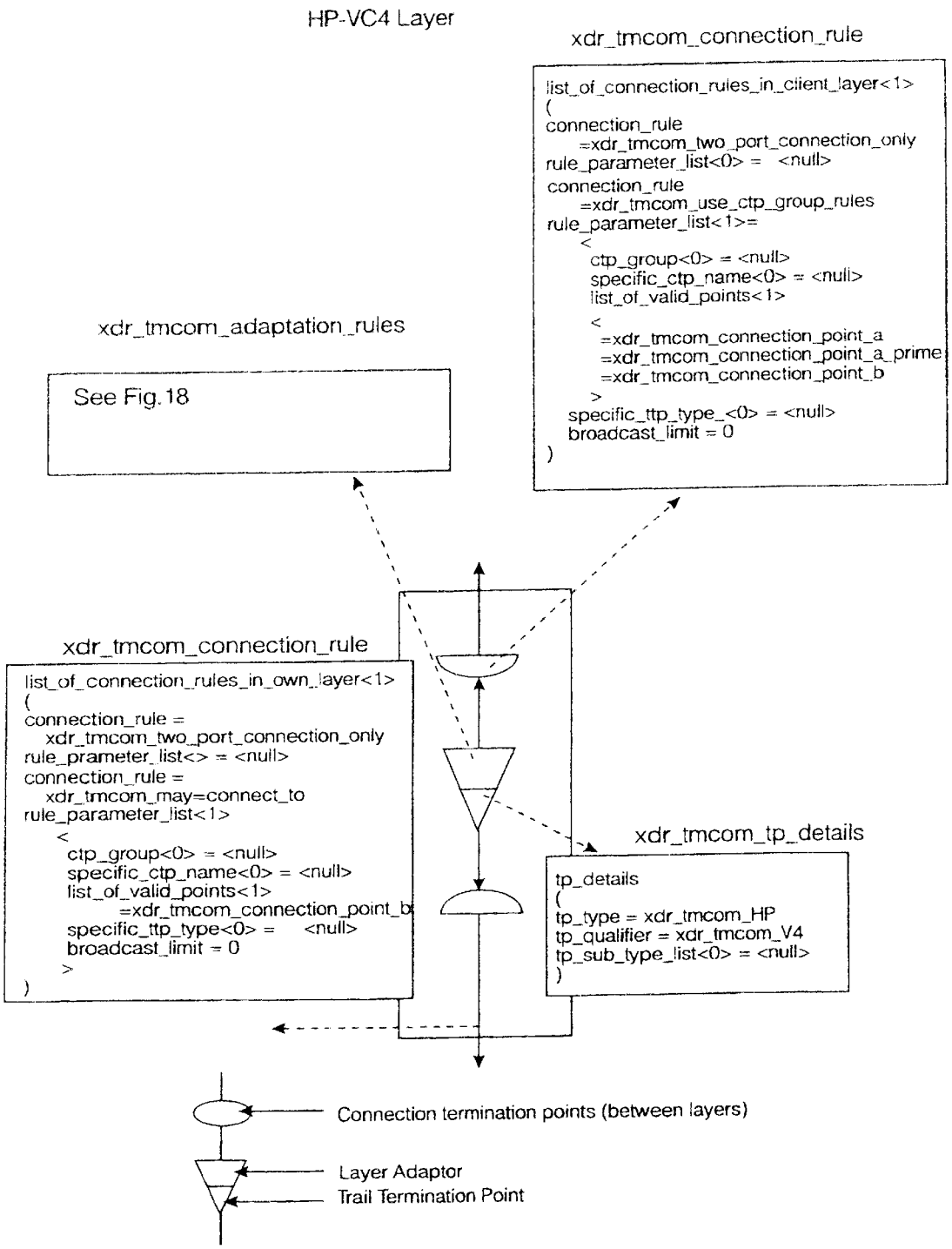
FIG. 17 illustrates schematically a data template representation of a trail termination point at a higher path layer of the SDH port as shown in FIG. 12.
Figure 18:
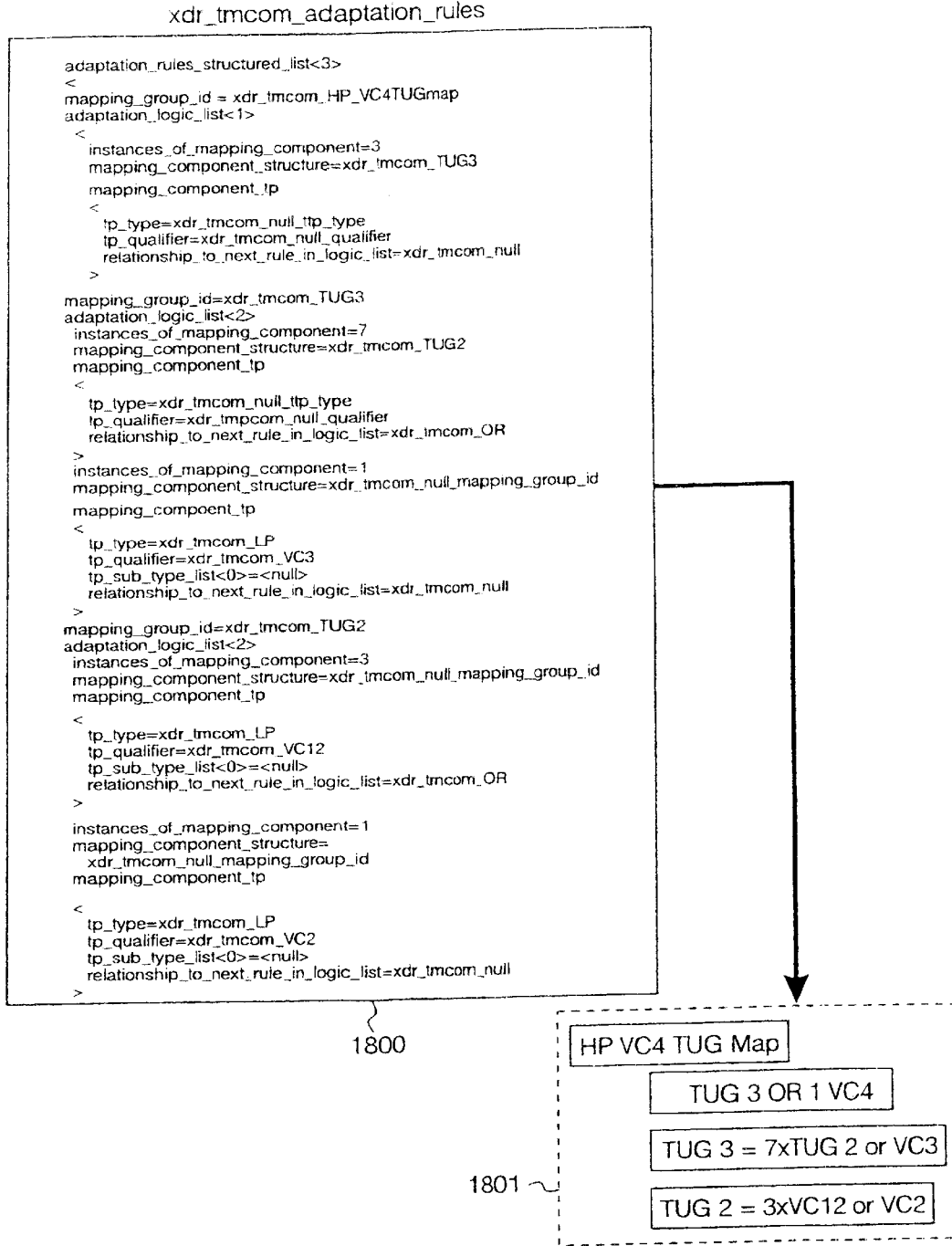
FIG. 18 illustrates schematically a set of adaptation rules of the data template representation of FIG. 17.

Referring to FIGS. 17 and 18, there is illustrated adaptation rule data 1800 for a higher order path VC-4 layer trail termination point template (FIG. 17) which illustrates a complex set of adaptation rules describing an SDH payload 1801. The SDH payload has tributary unit groups (TUG-3) as shown in FIG. 5 herein which map to seven TUG-2's or a VC-3, and each TUG-2 maps to three VC-12's, or a VC-2. Since not all multiplexers support the full mapping, restrictions within the multiplexer may be described by the adaptation rules 1800. Further, although in this implementation adaptation rules 1800 are shown as supporting an SDH payload, the adaptation rules may be altered to support 64 Kbits/s where thirty 64 Kbits/s map into a 2 Mbits/s tributary.

The adaptation rules comprise a means of specifying an adaptation tree structure, for example as shown in FIG. 5 herein, supported by a port. The adaptation rules comprise an adaptation logic list which sets out a tree structure of possible adaptations between layers in a protocol, for example the SDH protocol as shown in FIG. 18 herein. Mapping groups, eg TUG-2, TUG-3) are listed with corresponding respective instances of mapping components and identifications of mapping groups (mapping_group_id) and mapping component termination points (mapping_component_tp). This adaptation rule structure may be used to describe adaptations of other protocols, eg SONET or ATM.

Referring to FIGS. 6 to 8 herein, there will now be illustrated in general overview an example of a mode of operation of initialization of a managed object base of network manager 607, eg on first installation of one or a plurality of network elements, or following a fault condition.

Element controller 606 controlling network elements 600–605, on initialization or re-initialization of a network, reports to network manager 607 all of the network elements 600–605 under its control. The following simplified example assumes that a set of end point templates and CTP group templates have been installed during manufacture on each of the newly introduced network elements 600–605 in the network, and that initially the templates are not separately loaded into the element controller 606. For example, supposing network element 604 comprises a TN-1X type multiplexer, storing a first end point template A describing a first port type, and second network element 605 comprises a further TN-1X multiplexer storing a second end point template B describing a second type of port, and third network element 601 comprises a TN-16X multiplexer storing a third end point template type C describing a third port type, the first time that the network elements are introduced into the network, they transmit by way of a message signal over the operations administration and maintenance channel to element controller 606 the full end point templates, ie end point templates A, B and C, by way of enrol messages between the network elements 601, 604, 605 and the element controller 606. Element controller 606 stores the three different types of end point template, A, B, C. Since in an SDH environment each of network elements 601, 604, 605 are configured in a layered manner, each end point template type describes the number of termination points at a corresponding port type at different layers which are mandatorily bound together. This information is sent from the network elements to the element controller once only, on first introduction of the network element to the element controller as end point templates A, B, C. These end point templates may be arbitrarily assigned numbers, for example 1001, 1002, 1003 when stored in the element controller 606. Similarly, CTP group data describing the inter-connections between ports are each of the layers is transmitted from the network elements to the element controller once only, on first introduction of the network elements to the element controller.

Each port of the network element then enrols at the element controller by sending a corresponding respective end point data to the element controller. Within a single end point message from the network element, is contained all the end point data for each of a plurality of ports on a card. Each card of a network element may enrol with a separate end point message. An end point data indicates which template type the port corresponds to, and data describing the location of the port, ie on which network element it resides. Within the element controller, there is then instantiated each of the objects within the indicated end point template type for that particular enrolled port.

There will now be described communications between network manager 607 and element controller 606 on initialization of the network management system.

On initialization of the network management system, the network manager interrogates each element controller in order to discover the capabilities of the network elements comprising the network. The end point templates are transmitted from the network elements to the element controller once only. Communication between the network manager and the element controller in the best mode implementation herein is by way of XDR messages across TCP/IP communication link. Although communications between a network manager and a single element controller are described herein, it will be understood that in the network having a plurality of element controllers, similar communications occur between the network manager and a plurality of other element controllers. Although the sequence of communications between the network manager and the element controller are described in this specific example in an initialization operation, during general operation of the network management system, the messages described hereafter may be generated at any time by a network operator at the network manager, or by a network operator at the element controller.

Figure 19:
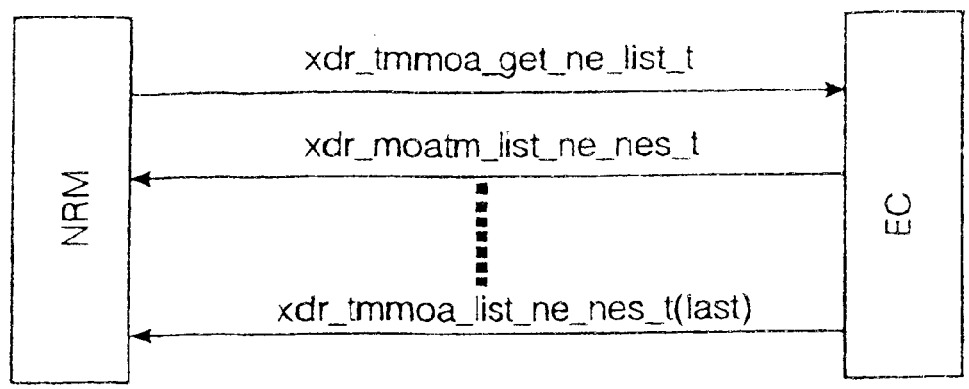
FIG. 19 illustrates schematically messaging between an element controller and the network manager for obtaining a list of network elements.

Referring to FIG. 19 herein, the network manager obtains a list of network elements connected to a particular element controller by sending a request message to the element controller over the XDR interface. An example of such a message is xdr_tmmoa_get_any_list_t. The element controller responds by sending a separate message for each individual network element connected to the element controller, back over the XDR interface to the network manager. Such messages may take the form as follows: xdr_moatm_list_of_nes_t . . . xdr_moatm_list_of_nes_t(last), these being messages describing each network element connected to the element controller.

Figure 20:
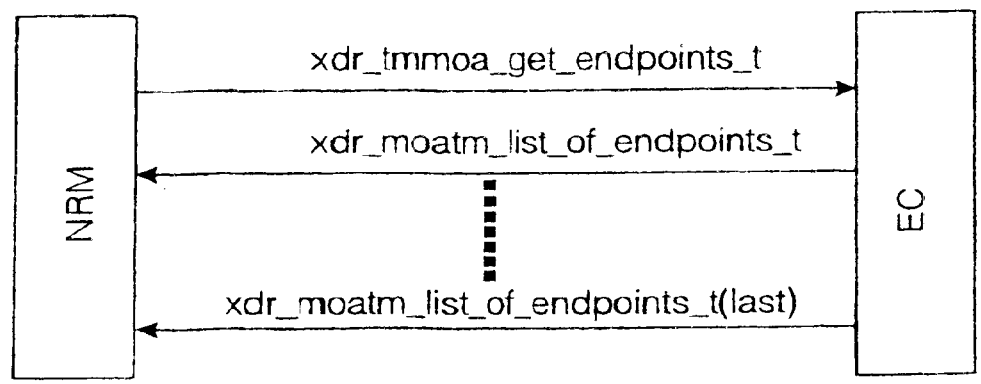
FIG. 20 illustrates schematically messaging between an element controller and a network manager for obtaining from the element controller a list of end points describing ports.

Having learnt of the network elements by interrogating the element controller, the network manager may then send an end point request message over the XDR interface in order to obtain a list of the end points corresponding to each physical and logical port within each network element connected to the element controller. One end point per individual physical or logical port is transmitted from the element controller to the network manager. Using the XDR interface, a sequence of messages between the network manager and element controller in the specific implementations herein is illustrated with reference to FIG. 20 herein. The network manager issues an end point request signal in the form xdr_tmmo_get_endpoints_t. On receipt of this message, the element controller interprets this message as a request to transmit end points to the network manager, and proceeds to transmit a separate end point message for each end point of each network element connected to the element controller. All of the end points relating to a single element controller may be sent within a single XDR message from the element controller to the network manager. A format for an end point message over the XDR interface may take the following form:

xdr_moatm_list_of_endpoints_t . . . xdr_moatm_list_of_endpoints_t(last)

which contains information describing all end points of all network elements connected to the element controller.

An example of a communication of end point data between the element controller and the network manager may be summarized as follows:

```
struct xdr_tmcom_endpoint_info (
    xdr_tmcom_universal_location      location< >;
    xdr_tmcom_endpoint_template_id    endpoint_template_id;
    xdr_tmcom_ctp_group_list          list_of_ctp_groups< >;
    string                            ec_location< >;
    string                            user_label< >;
);
```

| Parameter | Content |
|---|---|
| location | location of the endpoint. |
| endpoint_template_id | endpoint template identifier signifying which template this endpoint belongs to. |
| list_of_ctp_groups | list of CTP groups that this endpoint belongs to. If the CTP groups have been defined in the endpoint template then this parameter should be set to NULL using a zero length list. |
| ec_location | string identifier for the endpoint as described above. |
| user_label | user label for this endpoint. |

Figure 21:
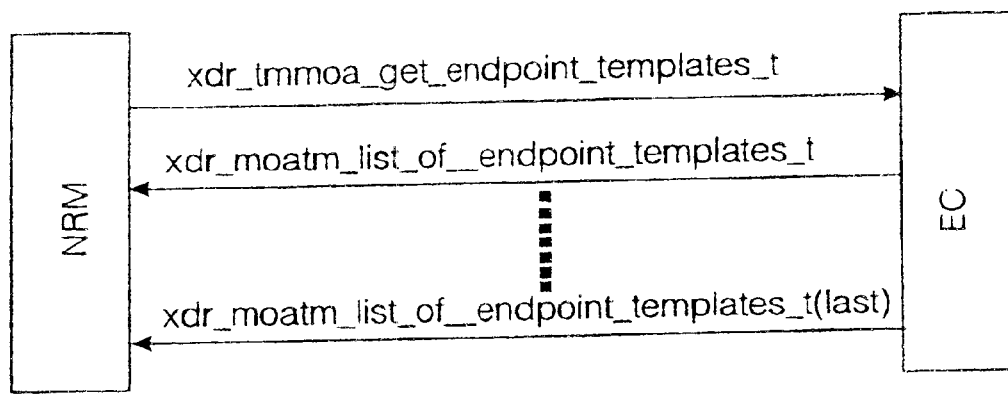
FIG. 21 illustrates schematically messaging between a network manager and an element controller for obtaining from the element controller a set of end point data templates representing internal physical resources of a plurality of ports of a network element.

Network manager 607 may learn about capabilities of network elements connected to element controller 606 by sending a message requesting end point templates from the element controller, over the XDR interface. An example of such a message is shown in FIG. 21 herein. Normally the network manager receives end point messages from the element controller. If it receives an end point message using an end point template reference identifier which it does not recognize, the network manager will request the corresponding end plate template from the managed object agent, to gain knowledge of the capabilities and capacities of those end points. Such a message may take the form xdr_tmmoa_get_endpoint_templates_t. Element controller 606 responds by sending data describing all end points relating to network elements to which it is connected back over the XDR interface to network manager 607. Such messages may take the form xdr_moatm_list_of_endpoint_templates_t . . . xdr_moatm_list_of_endpoint_templates_t(last).

An example of a message between the network manager and the element controller, describing an end point template is as follows:

```
struct xdr_tmcom_endpoint_template (
    xdr_tmcom_endpoint_template_id    endpoint_template_id;
    xdr_tmcom_directionality          directionality
    xdr_tmcom_ctp_group_list          list_of_ctp_groups< >;
    unsigned long                     number_of_instances_
                                      of_ctp;
    xdr_tmcom_ttp_template            list_of_ttp_templates< >;
);
```

An example of an identification parameter of the message is as follows:

```
struct xdr_tmcom_endpoint_template_id (
    unsigned long    xdr_tmcom_endpoint_template_number;
    string           xdr_tmcom_endpoint_template_name < >;
    unsigned long    xdr_tmcom_endpoint_template_parser_vintage;
);
```

An example of an XDR message transmitted between the network manager and the element controller describing directionality may be as follows:

```
enum xdr_tmcom_directionality (
    xdr_tmcom_direction_not_applicable,
    xdr_tmcom_bidirectional,
    xdr_tmcom_unidirectional,
    xdr_tmcom_unidirectional_tx
    xdr_tmcom_unidirectional_rx
);
```

Figure 22:
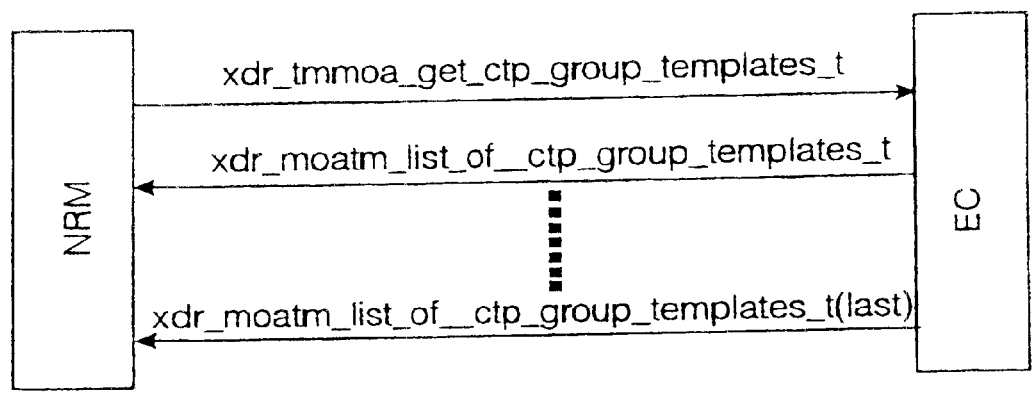
FIG. 22 illustrates schematically messaging between a network manager and element controller for obtaining from the element controller a set of connection termination point group data templates describing inter-connectivities between ports of a network element.

Similarly, to obtain data describing the CTP groups connecting ports within network elements, network manager issues a CTP template request message over the XDR interface. Element controller responds to the CTP group template request signal by forwarding XDR messages containing data describing the CTP group templates. Such messages may take the form xdr_moatm_list_of_ctp_group_templates_t . . . xdr_moatm_list_of_ctp_group_templates_t(last) as illustrated in FIG. 22 herein.

An example of the CTP group template identifier in an XDR message may be as follows:

```
struct xdr_tmcom_ctp_group_id (
    unsigned long    xdr_tmcom_ctp_group_number;
    string           xdr_tmcom_ctp_group_name< >;
    unsigned long    xdr_tmcom_ctp_group_parser_vintage;
);
```

There now follows a further example of operation of the network management system of FIG. 6, under conditions of introduction of a new port card into each of first and second network elements 601, 604. For example where network element 601 has an STM-1 port card, corresponding with another STM-1 port card on network element 604, there being an optical link 611 therebetween, each STM-1 port card always has the following layered termination point structure:

a VC-4 termination point a multiplex section termination point a regenerator section termination point an optical section termination point a physical media section terminal point In the prior art network management system, when a new STM-1 port card is installed in a network element, the above list of termination points are enrolled individually for each port, each as individual objects by transmitting those objects from the port card to the element controller. This occurs for each time a new port card is installed in a network element, ie the same set of objects is transmitted from the new STM-1 port card to the element controller. A network element transmits separate report messages describing the physical media section termination point, optical section termination point, regenerator section termination point, multiplex section termination point, VC-4 termination point, reports describing adaptation between the physical media section termination point and optical section termination point, reports describing adaptation between the optical section termination point and regenerator section termination point, a report describing adaptation between the regenerator section termination point and multiplex termination point, and a report describing adaptation between the multiplex section termination point and the VC-4 termination point. There are also transmitted a plurality of reference identifiers relating those termination points and adaptation points together. This information is exactly the same as the information transmitted by first network element 601 when it enrolled its STM-1 port card. Further under conditions of fault when the element controller loses information describing the network elements, in the prior art case, each port card enrols individually, causing duplication of the data transmitted between the network elements and the element controller but sending the same information. For example, where there are eight STM-1 port cards in a network, there will be eight sets of objects, each describing the corresponding respective STM-1 ports in different network elements.

In the best mode specific implementation herein, once a set of an STM-1 port card end point templates have been transmitted from the network element to the element controller, each time a new STM-1 port card of the same type is installed in the network, a set of end points is transmitted in the form of a short message across the OAM channel from the network element to the element controller. Since details describing an STM-1 port card are already stored in the end point template describing the STM-1 port card at the element controller, it is not necessary for the newly introduced STM-1 port card to transmit data describing each of its termination points, since this information is already installed at the element controller within the existing STM-1 end point template. Instead, the network element transmits the end points corresponding to the new ports, which is much shorter in terms of bytes of data than the full STM-1 port card end point templates. Thus, transmission of the end point message represents a significant data compression over the prior art case. Further, under conditions of faults in the network, if the information describing the network elements is lost from the element controller, and the network elements need to re-enrol at the element controller, the relatively short end point data types are transmitted from the network elements to the element controller, referencing the end point templates corresponding to the particular ports contained within those network elements. Upon enrollment of a port, an end point may be notified to the network manager via the XDR interface upon initiation of the element controller. The element controller can notify the network manager of enrollment or of de-enrollment of an end point by XDR messages across the XDR interface.

Figure 23:
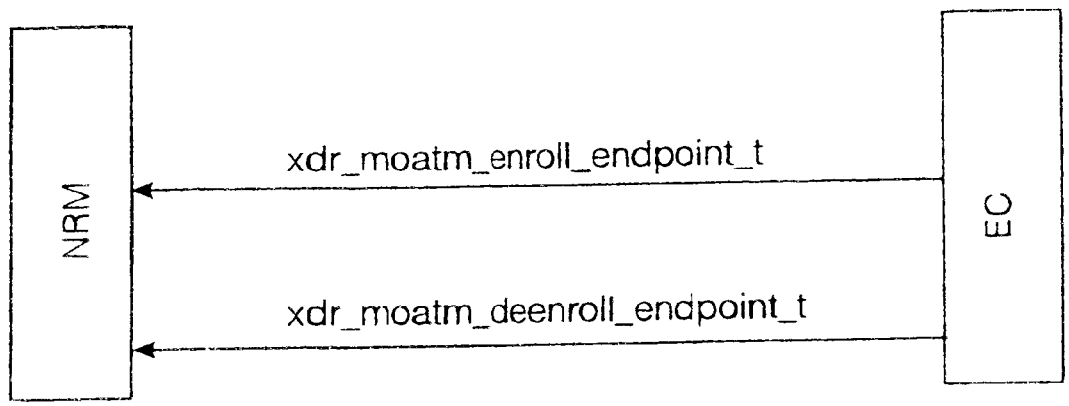
FIG. 23 illustrates schematically messaging between an element controller and a network manager for enroling a plurality of ports at the network manager.

Examples of enrollment and de-enrollment messages are illustrated in FIG. 23 herein.

In the specific implementation herein, element controller 601 recognizes that first and second multiplexers 604, 605, are of the same type and recognizes that STM-1 ports at each of first and second multiplexers 604, 605 are of a same type and therefore each have a same relationship of termination points and adaptations as each other.

What is claimed is:

1. In a communications network comprising a plurality of network elements, each network element having a plurality of physical resources arranged into a plurality of pre-configured structures, a method of proving management data describing functional resources for one of said plurality of network elements, the method comprising:

representing said functional resources by relating each said pre-configured structure with one or more pre-defined data templates which describe functional resources which are predefined according to a predetermined multi-layered communications protocol model; and referring to said pre-configured structures and related templates by means of a message generated by said network element, wherein said predefined functional resources comprise at least one termination point in a layer of said predetermined multi-layered communications protocol, at least one adaptation capability for adapting between said layer of said termination point and a client layer, and an internal connection capability for connecting said at least one termination point within said one of said plurality of network elements.

2. A method according to claim 1 wherein said connection rules comprise internal connection capabilities of a termination point within a same layer as said termination point.

3. The method as claimed in claim 1, wherein each said one or more predefined data templates describes a set of internal connection capabilities between a plurality of said plurality of pre-configured structures of said one of said plurality of network elements.

4. A network element having a set of data templates, said set comprising:

for each port of said network element at least one data template describing for each said port an internal connectivity capability between a plurality of protocol layers, each protocol layer associated with a termination point of an individual port type corresponding to each said port of said network element, and at least one data template describing for a plurality of ports of said network element, for at least one protocol layer, an internal connectivity capability within said at least one protocol layer between said plurality of ports of said network element.

5. A network controller having a plurality of sets of data templates, each set of data templates associated with a network element, each said set comprising:

for each port of said network element at least one data template describing for each said port an internal connectivity capability between a plurality of protocol layers, each protocol layer associated with a termination point of an individual port type corresponding to each said port of said network element, and at least one data template describing for a plurality of ports of said network element, for at least one protocol layer, an internal connectivity capability within said at least one protocol layer between said plurality of ports.

6. In a network comprising a plurality of network elements and at least one element controller for controlling a plurality of network elements, a method of enabling a network manager to discover the internal connection capabilities of each network element, comprising the steps of:

said network manager requesting each element controller to provide information on capabilities of a network element, said network element providing a set of data templates for each network element connected to said element controller to said network manager, each data template of said set of data templates comprising at least one data template describing for a port of said network element an internal connectivity capability between a plurality of protocol layers, each protocol layer associated with a termination point of an individual port type corresponding to said port of said network element, wherein said element controller provides said set of data templates of all network elements associated with said element controller within a single message to said network manager.

7. A management system for managing a network element comprising a plurality of physical resources arranged into a plurality of pre-configured structures each of a pre-configured structure type, said management system comprising data storage means for storing:

at least one predefined data template which describes functional resources which are predefined according to a predetermined multilayered communications protocol, and a plurality of reference data, each said reference data relating to a said pre-configured structure to at least one said data template, wherein each said data template is provided in a computer-readable medium for providing data in a computer-readable form, the template describing the functionality capabilities and internal physical constraints of a network element, the template comprising: a plurality of descriptions of the internal architectural configuration of said network element comprising a set of rules describing adaptation of data between protocol layers, each rule coupled to a set of rules describing exit and entry to a said protocol layer, each description being referenced to each other by means of a set of inter-end point connection rules.

8. A data representation provided in a computer-readable medium for providing data in a computer-readable form, the representation describing the functionality capabilities and internal physical constraints of a network element, the representation comprising:

a plurality of descriptions of the internal architectural configuration of said network element, each description comprising a set of rules describing adaptation of data between protocol layers, each rule coupled to a set of rules describing exit and entry to said protocol layer, each description being referenced to each other by means of a set of inter-end point connection rules.

9. A data representation as claimed in claim 8, wherein said data representation describes for a port of said network element an internal connectivity capability within the network element between a plurality of protocol layers, each protocol layer associated with a termination point of an individual port type corresponding to said port of said network element.

10. A data representation as claimed in claim 8, wherein said data representation describes for a plurality of ports of said network element, for at least one protocol layer, an internal connectivity capability within said at least one protocol layer between said plurality of ports.

11. A data representation as claimed in claim 8, wherein said data representation provides computer-readable data describing the internal connectivity capability of a port within said network element, said data comprising:
- a plurality of trail termination point templates within a port, wherein said plurality of trail termination point templates assembled in an end point template describes the internal capabilities of the port;
- an end point template identifier parameter uniquely identifying said endpoint template;
- at least one connection termination point within the port;
- a parameter identifying a directionality of said at least one connection termination point; and
- a reference identifier to at least one connection termination point group template provided in a computer-readable form which functionally describes the internal inter-connectivity between a plurality of ports associated with the end point template.

12. A data representation as claimed in claim 8, wherein said data representation provides computer-readable data describing the internal connectivity capability between a plurality of ports within said network element, the data describing which other protocol layers a current protocol layer connects to using rules defining connections between termination points of different ports provided within a protocol layer.

13. A data representation as claimed in claim 8, wherein said data representation provides a computer-readable data describing the internal connectivity capability between a plurality of ports within said network element, the data describing which other protocol layers a current protocol layer connects to using rules defining connections between groups of termination points provided within one layer and groups of termination points provided within said other protocol layers.

14. The data representation as claimed in claim 8, wherein said inter-end point connection rules describe internal connection capabilities of a termination point within a same layer as said termination point.

15. The data representation as claimed in claim 8, wherein said inter-end point connection rules describe internal connection capabilities of a termination point to a layer other than a layer of said termination point.

16. The data representation as claimed in claim 8, wherein said data representation includes termination point data comprising data describing a type of termination point.

17. The data representation as claimed in claim 8, wherein said set of rules describing the adaptation of data between protocol layers comprises data describing a relationship to a next rule in a logic list.

18. The data representation as claimed in claim 8, wherein characteristics of a termination point other than its layer are stored in a subtype of a data component of said termination point.

19. The data representation as claimed in claim 8, wherein said set of rules describing adaptation of data comprises data describing synchronous digital hierarchy protocols.

20. The data representation as claimed in claim 8, wherein said set of rules describing adaptation of data comprises data describing asynchronous transfer mode (ATM) protocols.

21. The data representation as claimed in claim 8, wherein said set of rules describing adaptation of data comprises data describing asynchronous transfer mode (ATM) protocols.

22. The data representation as claimed in claim 8, wherein said set of rules describing adaptation of data comprises data describing a 64 kilobits per second transport protocol.

23. The data representation claimed in claim 8, wherein said set of rules describing adaptation of data comprises data describing synchronous optical network (SONET) protocols.

* * * * *

UNITED STATES PATENT AND TRADEMARK OFFICE
CERTIFICATE OF CORRECTION

PATENT NO.    : 6,477,566 B1
DATED         : November 2, 2002
INVENTOR(S)   : Davis et al.

It is certified that error appears in the above-identified patent and that said Letters Patent is hereby corrected as shown below:

<u>Column 29,</u>
Line 13, the word "proving" should be -- providing --.

Signed and Sealed this

Twentieth Day of May, 2003

JAMES E. ROGAN
*Director of the United States Patent and Trademark Office*